United States Patent
Kazui et al.

(10) Patent No.: US 10,116,962 B2
(45) Date of Patent: Oct. 30, 2018

(54) IMAGE CODING DEVICE, IMAGE DECODING DEVICE, IMAGE CODING METHOD AND IMAGE DECODING METHOD

(71) Applicant: FUJITSU LIMITED, Kawasaki-shi, Kanagawa (JP)

(72) Inventors: Kimihiko Kazui, Kawasaki (JP); Jianqing Zhu, Shanghai (CN)

(73) Assignee: FUJITSU LIMITED, Kawasaki (JP)

( * ) Notice: Subject to any disclaimer, the term of this patent is extended or adjusted under 35 U.S.C. 154(b) by 5 days.

(21) Appl. No.: 15/258,365

(22) Filed: Sep. 7, 2016

(65) Prior Publication Data

US 2016/0381388 A1 Dec. 29, 2016

Related U.S. Application Data

(63) Continuation of application No. PCT/JP2014/056933, filed on Mar. 14, 2014.

(51) Int. Cl.
*H04N 9/80* (2006.01)
*H04N 11/02* (2006.01)
*H04N 19/593* (2014.01)
*H04N 19/70* (2014.01)
*H04N 19/176* (2014.01)
*H04N 19/182* (2014.01)

(52) U.S. Cl.
CPC ......... *H04N 19/593* (2014.11); *H04N 19/176* (2014.11); *H04N 19/182* (2014.11); *H04N 19/70* (2014.11)

(58) Field of Classification Search
CPC .. H04N 19/593; H04N 19/176; H04N 19/182; H04N 19/70
See application file for complete search history.

(56) References Cited

U.S. PATENT DOCUMENTS 7,302,006 B2 * 11/2007 Apostolopoulos ... H04N 19/176
375/240.24
8,615,138 B2 * 12/2013 Alakuijala ........... H04N 19/463
382/166

(Continued)

FOREIGN PATENT DOCUMENTS

JP 2002-142119 5/2002
JP 2003-134532 5/2003

(Continued)

OTHER PUBLICATIONS

ITU-T H.265 ISO/IEC 23008-2, "High efficiency video coding", Series H: Audiovisual and Multimedia Systems Infrastructure of audiovisual services—Coding of moving video Apr. 2013, (317 pages).

(Continued)

*Primary Examiner* — Gregory M Desire
(74) *Attorney, Agent, or Firm* — Staas & Halsey LLP

(57) ABSTRACT

A generation circuit generates first palette information from a decoded image of a first block used for predicting second palette information of a second block in a coding target image when the first block has not received palette coding. A storage circuit stores the first palette information. A coding circuit performs prediction coding on the second palette information by using the first palette information so as to generate coded palette information.

14 Claims, 19 Drawing Sheets

(56) References Cited

U.S. PATENT DOCUMENTS

| | | | |
|---|---|---|---|
| 2001/0036308 A1 | 11/2001 | Katayama et al. | |
| 2004/0156543 A1* | 8/2004 | Gardella | G06T 9/005 |
| | | | 382/166 |
| 2007/0097450 A1 | 5/2007 | Yamamoto | |
| 2015/0181223 A1* | 6/2015 | Gisquet | H04N 19/593 |
| | | | 375/240.12 |
| 2017/0054988 A1* | 2/2017 | Lin | H04N 19/105 |
| 2017/0332073 A1* | 11/2017 | Lin | H04N 19/186 |
| 2017/0332091 A1* | 11/2017 | Maeda | H04N 19/176 |

FOREIGN PATENT DOCUMENTS

| | | |
|---|---|---|
| JP | 2007-88687 | 4/2007 |
| JP | 2007-151085 | 6/2007 |
| JP | 2007-312152 | 11/2007 |
| JP | 2008-311792 | 12/2008 |
| JP | 2011-139156 | 7/2011 |

OTHER PUBLICATIONS

Flynn et al., "High Efficiency Video Coding (HEVC) Range Extensions text specification: Draft 6", JCTVCP1005, 16th JCT-VC Meeting, San Jose, US, Jan. 2014, pp. 9-17.

Lan et al., "Improvements of the BCIM mode for screen content coding", JCTVC-F200, 6th JCT-VC Meeting, Torino, IT, Jul. 2011, pp. 14-22.

Zhu et al., "Template-based palette prediction", JCTVC-N0169, 13th JCT-VC Meeting, Incheon, KR, Apr. 2013, pp. 18-26.

Guo et al., "RCE3: Results of Test 3.1 on Palette Mode for Screen Content Coding", JCTVCN0247, 14th JCT-VC Meeting, Vienna, AT, Jul. 25-Aug. 2, 2013, (7 pages).

Guo et al., "Non-RCE3: Modified Palette Mode for Screen Content Coding", JCTVCN0249, 14th JCT-VC Meeting, Vienna, AT, Jul. 25-Aug. 2, 2013 (6 pages).

Chuang et al., "Non-RCE4: Major color table propagation through non-palette CUs", Joint Collaborative Team on Video Coding (JCT-VC) of ITU-T SG 16 WP 3 and ISO/IEC JTC 1/SC 29/WG 11, JCTVC-P0096r2, 16th Meeting: San Jose, US, Jan. 2014, pp. 1-6.

Jin et al., "Non-RCE4: Palette prediction for palette coding", Joint Collaborative Team on Video Coding (JCT-VC) of ITU-T SG 16 WP 3 and ISO/IEC JTC 1/SC 29/WG 11, JCTVC-P0160_v6, 16th Meeting: San Jose, CA, Jan. 2014, pp. 1-14.

Guo et al., "Palette Mode for Screen Content Coding", Joint Collaborative Team on Video Coding (JCT-VC) of ITU-T SG 16 WP 3 and ISO/IEC JTC 1/SC 29/WG 11, JCTVC-M032312, 13th Meeting, Incheon, KR, Apr. 2013, pp. 1-11.

International Search Report dated May 27, 2014 in corresponding International Application No. PCT/JP2014/056933.

\* cited by examiner

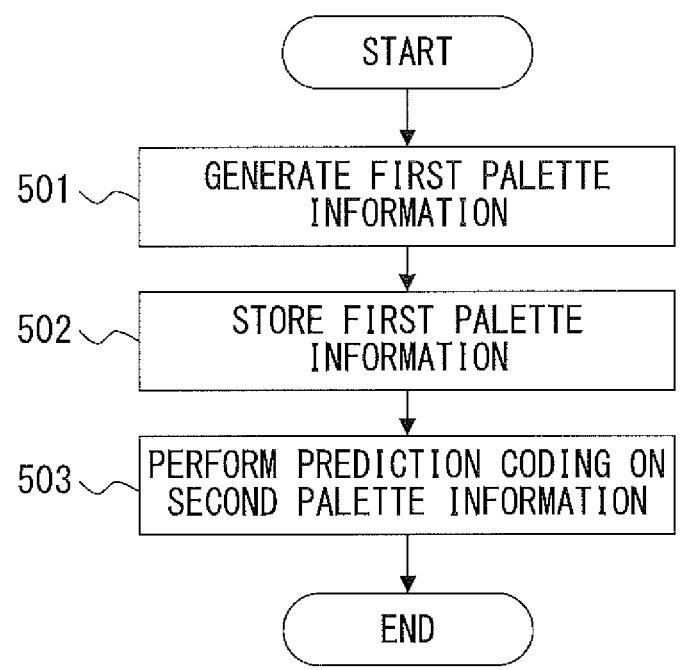
F I G. 5

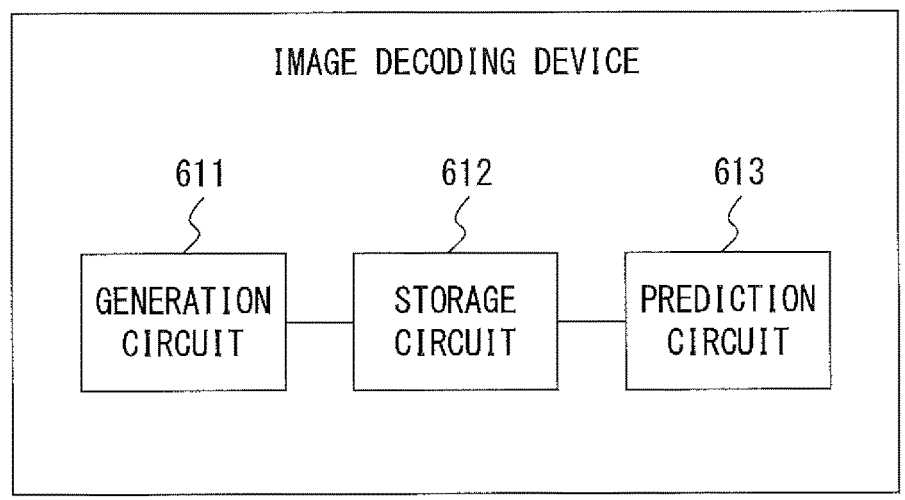
F I G. 6

| |
|---|
| SeqParameterSetRbsp( ) { |
|   SpsVideoParameterSetId |
|   .... |
|   if ( VuiParametersPresentFlag ) |
|     VuiParameters( ) |
|   SpsExtensionPresentFlag |
|   if ( SpsExtensionPresentFlag ) |
|     SpsExtensionFlag[ 0 ] |
|     SpsExtension7bits |
|     if ( SpsExtensionFlag[ 0 ] ) { |
|       PaletteCodingEnabledFlag |
|     } |
|   .... |
| } |

FIG. 10

```
CodingUnit( x0, y0, lo2CbSize ) {
    if ( TransquantBypassEnabledFlag )
        CuTransquantBypassFlag
    nCbS = ( 1 << log2CbSize )
    if ( PaletteCodingEnabledFlag ) {
        PaletteCodingFlag
        if ( PaletteCodingFlag ) {
            PalettePredictionFlag
            if ( PalettePredictionFlag )
                PalettePredFromLeftFlag
            if ( !PalettePredictionFlag ) {
                PaletteSizeMinus1
                for ( cIdx = 0; cIdx < 3; cIdx++ )
                    for ( i = 0; i < PaletteSizeMinus1; i ++ )
                        Palette[ i ][ cIdx ]
                        if ( cIdx == 0 && i > 0 )
                            Palette[ i ][ cIdx ] += Palette[ i - 1 ][ cIdx ]
                for ( i = 0; i < nCbS * nCbS; i ++ ) {
                    PaletteIdx[ i ]
                    if ( i != 0 )
                        palette_idx[ i ] += palette_idx[ i - 1 ]
                    xC = i % nCbS
                    yC = i / nCbS
                    PaletteMap[ i % nCbS ][ i / nCbS ] = PaletteIdx[ i ]
                }
            }
        }
        ....
}
```

F I G. 1 1

```
CodingUnit( x0, y0, lo2CbSize ) {
    if ( TransquantBypassEnabledFlag )
        CuTransquantBypassFlag
    nCbS = ( 1 << log2CbSize )
    if ( PaletteCodingEnabledFlag ) {
        PaletteCodingFlag
        if ( PaletteCodingFlag ) {
            PalettePredictionFlag
            if ( PalettePredictionFlag )
                PalettePredFromLeftFlag
            if ( !PalettePredictionFlag ) {
                PaletteSizeMinus1
                for ( cIdx = 0; cIdx < 3; cIdx++ )
                    for ( i = 0; i < PaletteSizeMinus1; i ++ )
                        Palette[ i ][ cIdx ]
                for ( i = 0; i < nCbS * nCbS; i ++ ) {
                    PaletteIdx[ i ]
                    if ( i != 0 )
                        palette_idx[ i ] += palette_idx[ i - 1 ]
                    xC = i % nCbS
                    yC = i / nCbS
                    PaletteMap[ i % nCbS ][ i / nCbS ] = PaletteIdx[ i ]
                }
            }
        }
    ....
}
```

FIG. 12

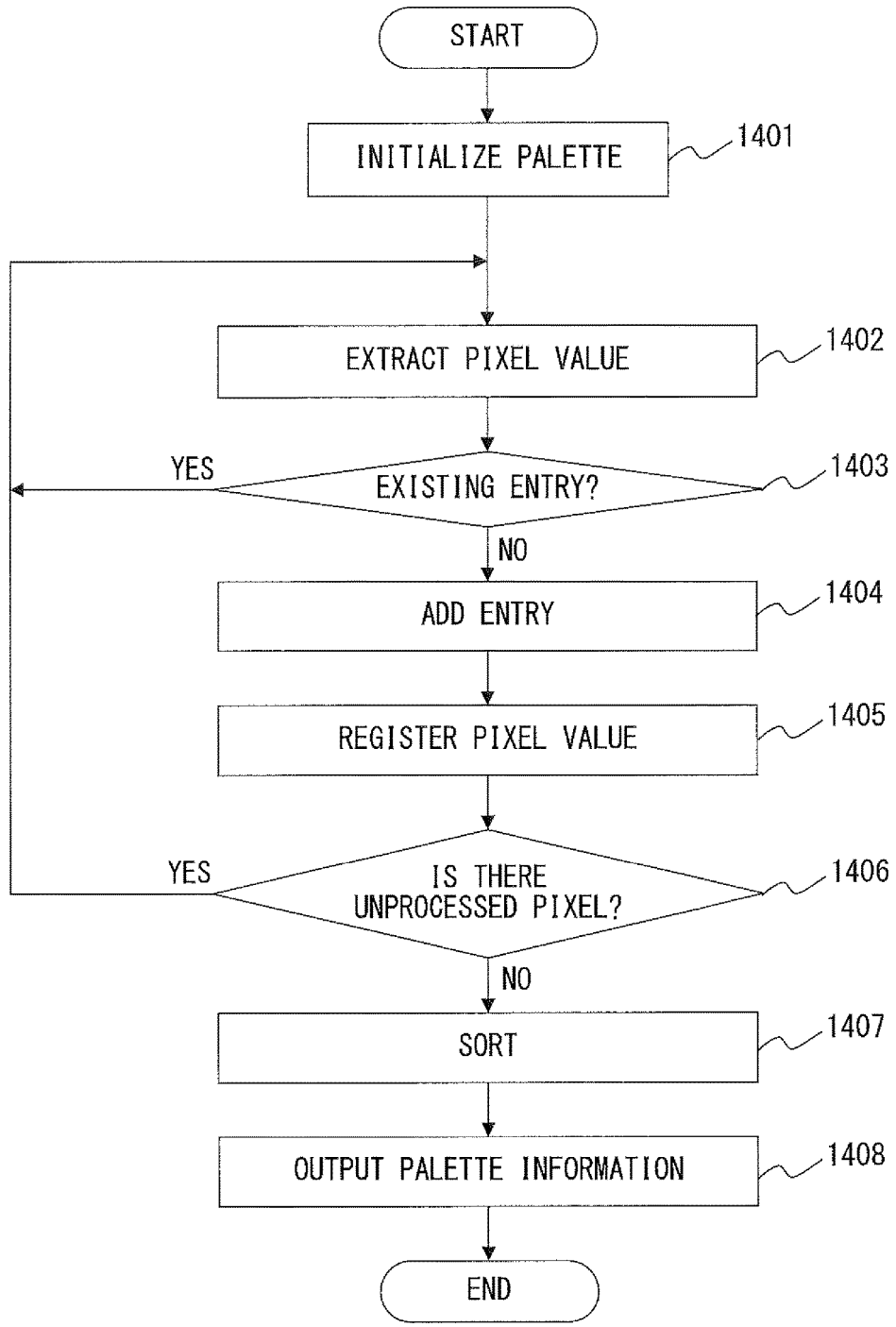
F I G. 1 4

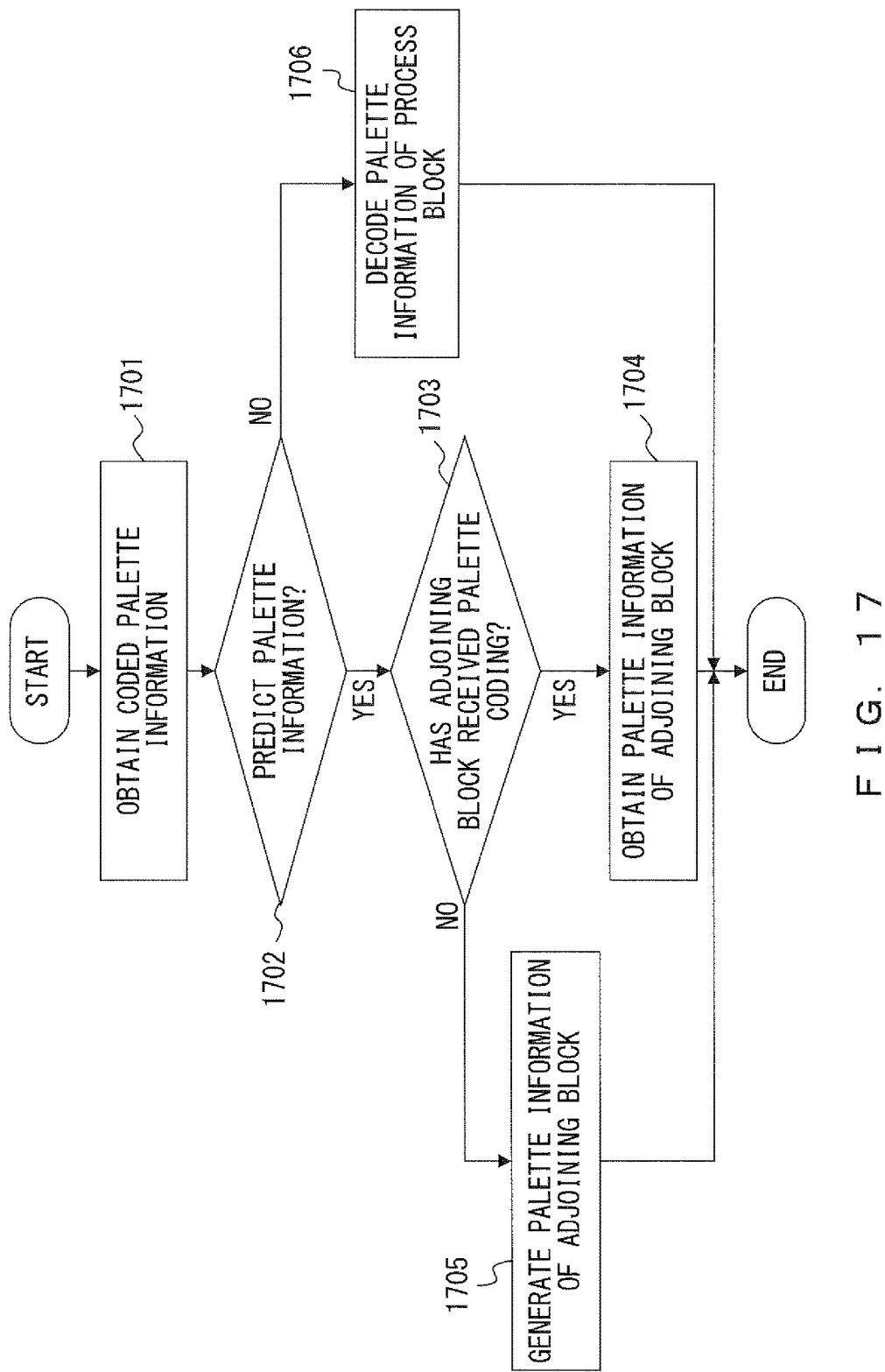
F I G. 17

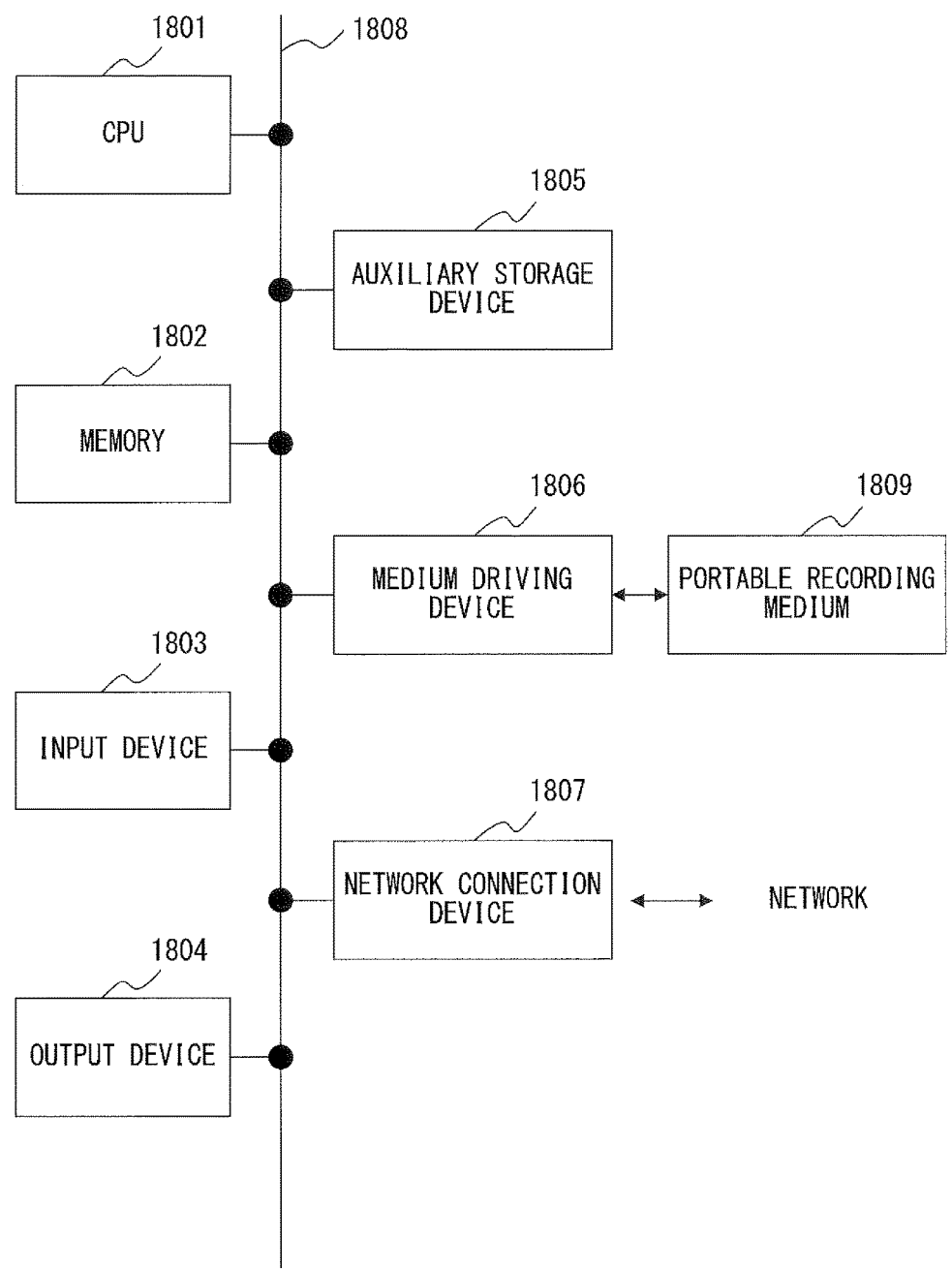
F I G. 1 8

IMAGE CODING DEVICE, IMAGE DECODING DEVICE, IMAGE CODING METHOD AND IMAGE DECODING METHOD

CROSS-REFERENCE TO RELATED APPLICATION

This application is a continuation application of International Application PCT/JP2014/056933 filed on Mar. 14, 2014 and designated the U.S., the entire contents of which are incorporated herein by reference.

FIELD

The embodiments discussed herein are related to an image coding device, an image decoding device, an image coding method and an image decoding method.

BACKGROUND

In many cases, video data exists using an immense amount of data. Accordingly, when video data is transmitted from a transmission device to a reception device or when video data is stored in a storage unit, that video data receives compression coding.

As representative video coding standards, Moving Picture Experts Group phase 2 (MPEG-2), MPEG-4 or MPEG-4 Advanced Video Coding (MPEG-4 AVC/H.264) are known. These video coding standards are developed by International Organization for Standardization/International Electrotechnical Commission (ISO/IEC).

Also, as a new video coding standard, High Efficiency Video Coding (HEVC, MPEG-H/H.265) is being developed (see non patent document 1 for example).

The above video coding standards adopt two coding methods, i.e., the inter prediction coding and the intra prediction coding. The inter prediction coding is a coding method that uses information of a coded picture in order to code a coding target picture, while the intra prediction coding is a coding method that uses only information included in the coding target picture in order to code the coding target picture.

Videos that are subjects of these video coding standards are natural images, which are obtained mainly by using various types of cameras. However, accompanying the progress in the information technology for consumers in recent years, a trend has emerged in which video coding is applied to screen content images such as those displayed in a personal computer (PC) desk top etc. in addition to the application of video coding to natural images.

As a specific example of video coding of screen content images, there is a wireless display, which wirelessly transmits images displayed on a PC or a game device to a flat panel display device. As another specific example, there is Virtual Display Infrastructure (VDI), which transmits a user window of a virtual operating system to a mobile device using the Internet protocol.

Screen content images are artificial images generated by using computer graphics etc., and have characteristics different from those of natural images. The first characteristic of screen content images is low correlation of pixels. In natural images, the correlation is high between the pixel value of a target pixel and the pixel value of an adjoining pixel. Discrete Cosine Transform (DCT) adopted by all video coding standards utilizes this high correlation, and can realize high compression efficiency.

By contrast, a screen content image has many regions in which the correlation of pixel values is low. Examples of this include the boundary portions between the foreground and the background in an animation screen, the outlines of characters in PC window, and others. When DCT is applied to these regions, distortions of high-frequency components called mosquito distortions are perceived visually and remarkably particularly under a condition with a low bitrate.

The second characteristic of screen content images is repeating of the same pattern. A display window of text editing software executed by a PC for example displays many same characters.

The third characteristic of screen content images is a poor variation of pixel values. In an example of text editing software, the display window is often configured of a uniform background color (such as a white color) and character fonts using a limited color such as a black color etc. An RGB 24-bit natural image allows RGB combinations of $2^{(8*3)}$ colors (=16,777,216 colors), while a screen contents image often limits the number of RGB combinations to several tens of colors at most.

In the first version of the HEVC, which was internationally standardized in 2013, a technique of conducting highly-efficient compression coding on screen content images is introduced partially. A specific example among others is Transform Skip (TS), which skips DCT applied for prediction errors in the intra prediction coding and the inter prediction coding.

Further, in the next version of HEVC, which is being standardized, a technique of increasing further the compression efficiency of screen content images is about to be introduced (see non patent document 2 for example). Specific examples include the intra block copy that is suitable for the second characteristic of a screen contents image and the palette coding that is suitable for the third characteristic of a screen contents image.

The intra block copy is a coding scheme that introduces the concept of the inter prediction coding to the intra prediction coding. In the intra block copy, the displacement between a process block, which is a coding target, and an area having a pixel value close to those of the process block is coded. This displacement is information corresponding to motion vectors in the inter prediction coding.

Next, before explaining the palette coding, explanations will be given to the poorness of the variation of pixel values, which is the third characteristic of screen content images.

FIG. 1 illustrates a distribution of pixel values in a case when a black character "i" is displayed on the white background in a desktop window of a PC as an example of a screen content image. In order to explain the distribution of the pixel values by using gray scale images instead of color images, FIG. 1 through FIG. 3 use images obtained by converting RGB 24-bit color images into gray scale images and performing dithering on the resultant images.

The pixel values in an image 101 in the rectangular area containing character "i" displayed in the display window of the PC are for white colors for the background and black colors for the foreground, which account for only a small part of the 16,777,216 colors that can emerge in natural images.

An image 102 is a result of enlarging the image 101 so that each pixel can be identified. When a character is displayed on a display window of a PC, an anti-aliasing process is often applied so that the outline of the character looks smooth. Due to the anti-aliasing process, colors other than white or black colors emerge around character "i". Still, the number of the emerging colors is limited, and is only five in the example illustrated in FIG. 1.

A palette 103 represents the variation of the pixel values included in the image 102 and includes a list of pairs of indexes and RGB values. Each entry in the palette 103 includes an index and an RGB value, and an RGB value includes the pixel values of R, G and B. An index is identification information for colors, and is referred to as a color number. A variation of pixel values described by a palette is also referred to as palette information.

Palette coding is a technique that utilizes the above smallness in the number of colors in images so as to achieve compression efficiency higher than that of DCT. Specifically, a palette is first used so as to replace the pixel value of each pixel in a process block as a coding target with the corresponding index in the palette. Next, a plurality of indexes are converted into one-dimensional data through a coding scheme such as Differential Pulse Code Modulation (DPCM) etc. Then, the encoded indexes and the palette information receive entropy coding. Palette coding can realize high compression efficiency for screen content images.

FIG. 2 illustrates an example of palette coding. When the image 102 illustrated in FIG. 1 is an image of a process block, a palette 103 is generated from each pixel value of the image 102. Next, by replacing each pixel value of the image 102 with an index by using the palette 103, an index image 201 is generated. Thereafter, the index image 201 is coded by DPCM etc., and a coded image is generated.

A technique of improving the Base Color and Index Map (BCIM) mode for coding screen content images is also known (see non patent document 3 for example). Prediction coding of palette information based on a template is also known (see non patent document 4 for example). Prediction coding of palette information based on an adjoining block is also known (see non patent document 5 for example). Modification of the palette mode of non patent document 5 is also proposed (see non patent document 6 for example).

An image compression device is also known that can improve, without deteriorating the image quality, the compression rate even for image data, of multiple values, that is expressed in a color palette scheme (see patent document 1 for example). An efficient image compression device having scalability for an image of multiple values is also known (see patent document 2 for example).

An image process system is also known that can display more colors than the number of colors in the color palette of a computer terminal or a mobile terminal that is to be accessed. An image coding device is also known that determines a threshold for determining whether to conduct pelletization in accordance with the block size of the unit of coding, and thereby improves the coding efficiency.

Patent document 1: Japanese Laid-open Patent Publication No. 2002-142119
Patent document 2: Japanese Laid-open Patent Publication No. 2003-134532
Patent document 3: Japanese Laid-open Patent Publication No. 2007-312152 (Japanese Patent No. 3944524)
Patent document 4: Japanese Laid-open Patent Publication No. 2008-311792
Non patent document 1: ITU-T H.265| ISO/IEC 23008-2, "High efficiency video coding", 2013
Non patent document 2: D. Flynn et al., "High Efficiency Video Coding (HEVC) Range Extensions text specification: Draft 6", JCTVC-P1005, 16th JCT-VC Meeting, San Jose, US, 9-17 Jan. 2014

Non patent document 3: C. Lan, J. Xu, G. J. Sullivan, F. Wu, "Improvements of the BCIM mode for screen content coding", JCTVC-F200, 6th JCT-VC Meeting, Torino, I T, 14-22 July, 2011
Non patent document 4: W. Zhu, H. Yang, "Template-based palette prediction", JCTVC-N0169, 13th JCT-VC Meeting, Incheon, K R, 18-26 Apr. 2013
Non patent document 5: L. Guo, M. Karczewicz, J. Sole, "RCE3: Results of Test 3.1 on Palette Mode for Screen Content Coding", JCTVC-N0247, 14th JCT-VC Meeting, Vienna, AT, 25 July-2 Aug. 2013
Non patent document 6: L. Guo, M. Karczewicz, J. Sole, R. Joshi, "Non-RCE3: Modified Palette Mode for Screen Content Coding", JCTVC-N0249, 14th JCT-VC Meeting, Vienna, AT, 25 July-2 Aug. 2013

SUMMARY

According to an aspect of the embodiments, an image coding device includes a generation circuit, a storage circuit and a coding circuit.

The generation circuit generates first palette information from a decoded image of a first block used for predicting second palette information of a second block in a coding target image when the first block has not received palette coding. The storage circuit stores the first palette information. The coding circuit performs prediction coding on the second palette information by using the first palette information so as to generate coded palette information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a flowchart illustrating an image coding process;
FIG. 6 illustrates a configuration of an image decoding device;
FIG. 10 illustrates a structure of a sequence parameter set;
FIG. 11 illustrates a structure of a first CU;
FIG. 12 illustrates a structure of a second CU;
FIG. 14 is a flowchart illustrating a palette information generation process in the image coding device.

FIG. 17 is a flowchart illustrating a palette information generation process in the image decoding device; and FIG. 18 illustrates a configuration of an information processing apparatus.

DESCRIPTION OF EMBODIMENTS

Figure 1:
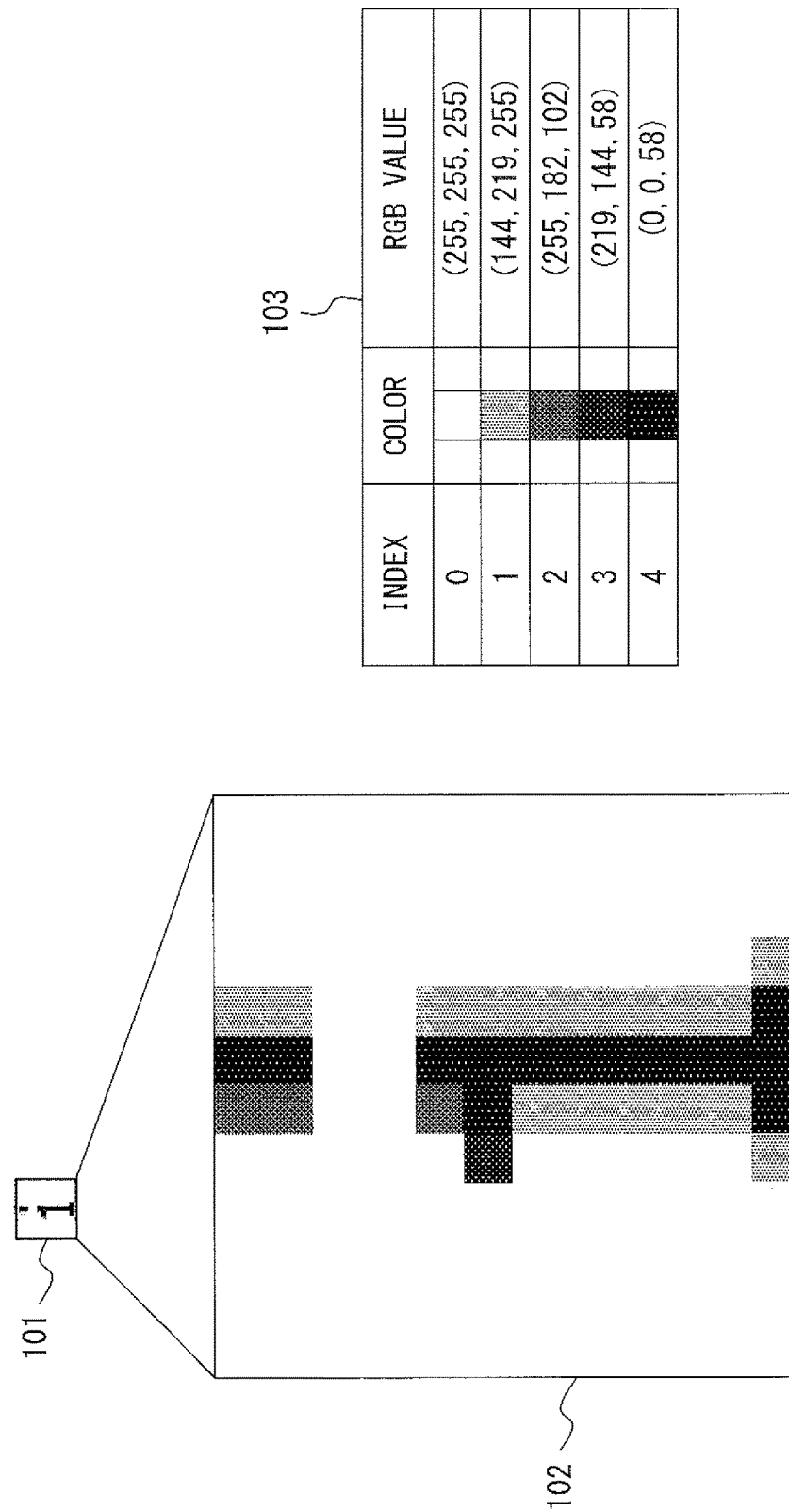
FIG. 1 illustrates a screen content image.

Hereinafter, the embodiments will be explained in detail by referring to the drawings.

In palette coding, a process block as a coding target is coded by using palette information of the process block. Usually, palette information is generated by an image coding device by using the pixel values of a process block that is input to the image coding device. Then, an image decoding device uses the palette information transmitted from the image coding device, and thereby inversely converts the indexes included in the coded image of the process block into pixel values.

Figure 2:
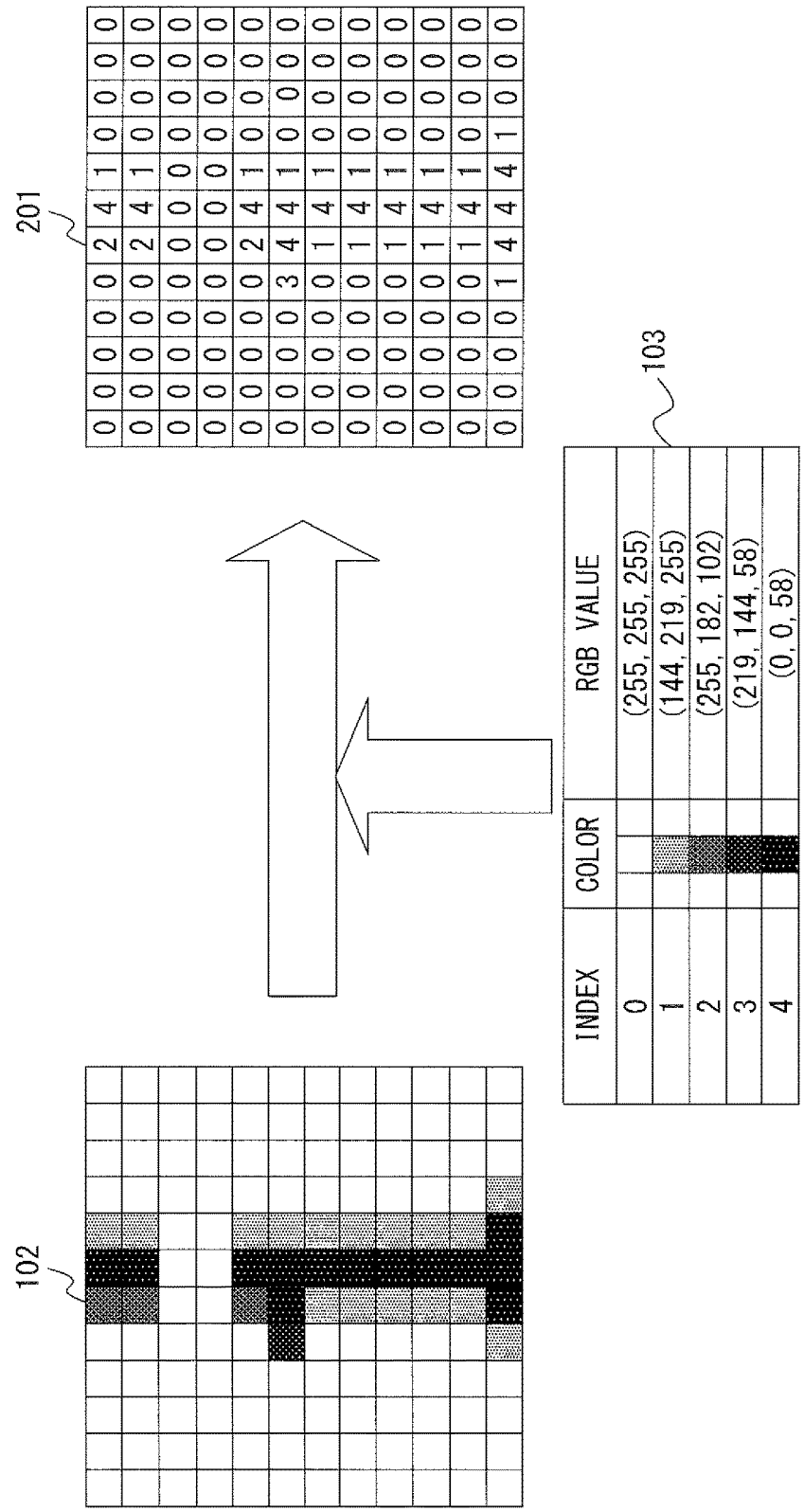
FIG. 2 illustrates palette coding.

The total amount of information in the palette 103 illustrated in FIG. 2 is 123 bits, which is the sum of the 3 bits for expressing the number of indexes "5" and 120 (5×24) bits for expressing the RGB values (24 bits) corresponding to the five indexes. The amount of information in the palette linearly increases in response to an increase in the number of indexes. Thus, transmission of palette information from an image coding device to an image decoding device for each block is not desirable in view of coding efficiency.

Incidentally, adjoining blocks, which are adjoining a process block, often contain pixel values close to those of the process block and thus are highly likely to have the same palettes. Non patent document 5 proposes prediction coding of palette information that utilizes this fact so as to use the palette of an adjoining block as the palette of a process block.

Also, non patent document 4 proposes prediction coding that generates a template of a palette for each slice instead of simply using the palette of an adjoining block, and codes the difference between the template and the palette of the process block.

In order to perform prediction coding of palette information highly efficiently, it is desirable that a coded adjoining block be in a palette coded state. This is because palette information is transmitted from an image coding device to an image decoding device explicitly or by using prediction information for performing palette coding.

However, in the coding of screen content images, adjoining blocks are not always in a palette codded state.

Figure 3:
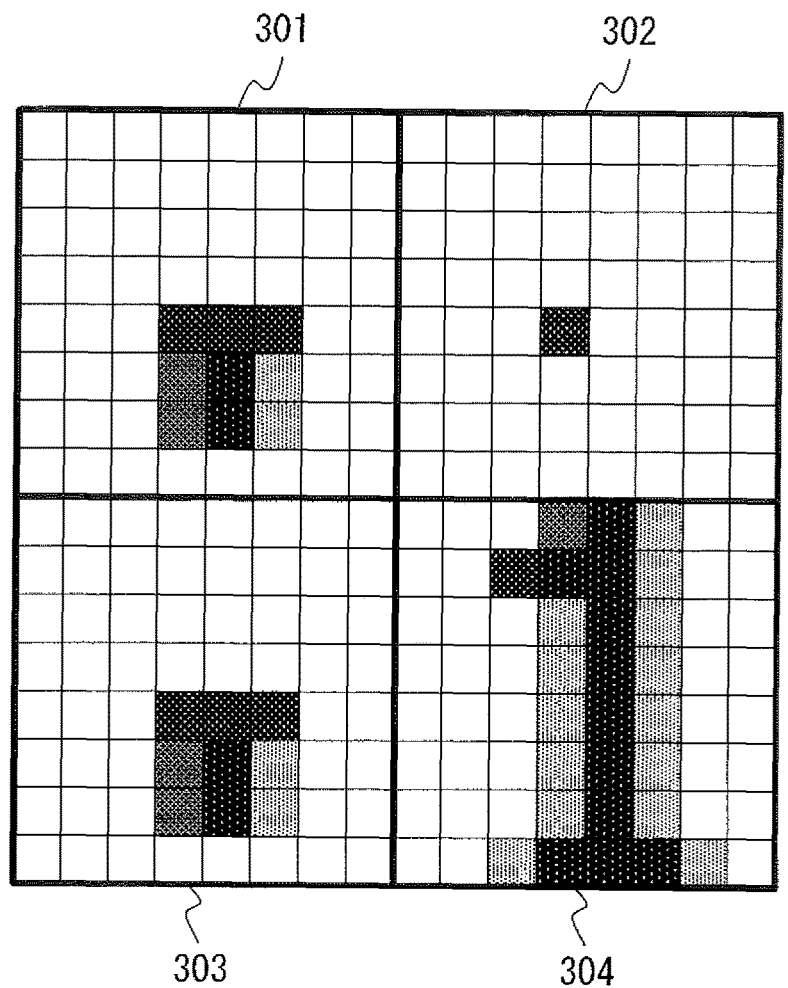
FIG. 3 illustrates an image in which an adjoining block has not received palette coding.

FIG. 3 illustrates an example of an image in which an adjoining block has not received palette coding. When a block 304 among blocks 301 through 304 illustrated in FIG. 3 is a process block, the blocks 301 through 303 are adjoining blocks that adjoin the process block 304 on the upper left, the above and the left, respectively. It is assumed in this example that the palette information of the process block 304 is predicted by using the palette information of the upper adjoining block 302 or the left adjoining block 303.

The upper adjoining block 302 has a pixel value variation poorer than that of the process block 304, and is not desirable as an adjoining block used for predicting palette information. By contrast, the left adjoining block 303 has the same pixel value variation as that of the process block 304, and is desirable as an adjoining block used for predicting palette information.

However, because the left adjoining block 303 has the same pixel value distribution as that of the upper-left adjoining block 301, the intra block copy described in non patent document 2 for example is applied for coding the left adjoining block 303. This results in a situation where the left adjoining block 303 has pixel values close to those of the process block 304 but does not receive palette coding and palette information of the left adjoining block 303 is not generated.

In such a case, when palette coding is performed on the process block 304, the prediction coding of the palette information is not performed but the palette information of the process block 304 is explicitly coded. This makes the coding efficiency lower than that of a case when the palette information of the process block 304 receives prediction coding.

Also in a case when adjoining blocks have received the intra prediction coding or the inter prediction coding, the palette information of the adjoining blocks is not generated, deteriorating the coding efficiency.

Note that this problem occurs not only in a case of performing palette coding on a screen content image but also in a case of performing palette coding on other images that have poor pixel value variations. Also, this problem occurs not only in a case of performing palette coding on a video but also in a case of performing palette coding on a still image. Further, this problem occurs not only in a case of predicting palette information by using an adjoining block but also in a case of predicting palette information by using other blocks.

A conventional algorithm for generating palette information does not have to be selected uniquely, but the image coding device can determine which algorithm to use. In the example illustrated in FIG. 1 for example, the color with the RGB value of (144, 219, 255) can be assigned to the first entry corresponding to index "0" instead of the color with the RGB value of (255, 255, 255) from among the colors included in the palette 103. What color is to be assigned to what index can be determined so that for example the indexes can receive DPCM coding the most efficiently.

Palette information is generated from the pixel values included in a block, and a decoded pixel value generated by an image decoding device is equal to a local decoded pixel value generated by an image coding device. Thus, the inventors have discovered, by uniquely determining an algorithm for generating palette information from a pixel value, the image coding device and the image decoding device can use the same algorithm. This makes it possible for the image decoding device to generate the palette information of a block that has not received the palette coding, in the same format as that used by the image coding device.

The image decoding device predicts the palette information of a process block by using the palette information generated from a decoded image of an adjoining block and thereby can generate the palette information of the process block even when the adjoining block has not received the palette coding. This makes it possible to restore the pixel values from the indexes of a process block without explicitly transmitting the palette information of the process block from the image coding device to the image decoding device.

Figure 4:
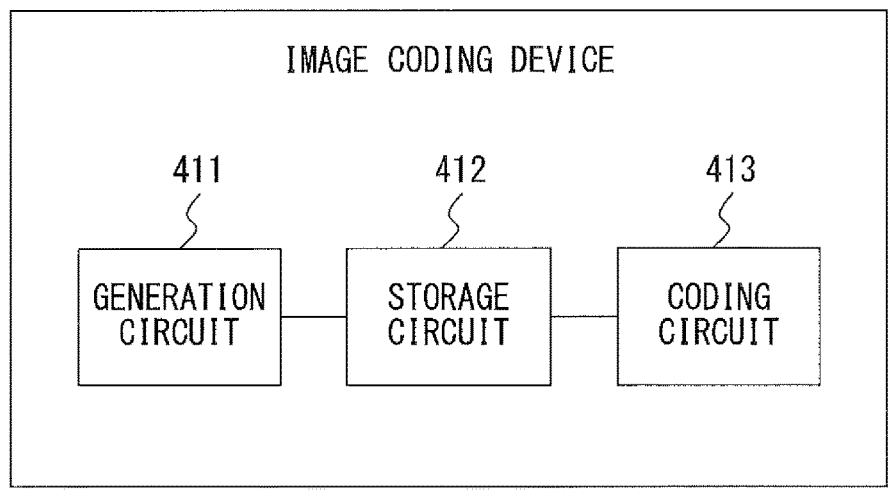
FIG. 4 illustrates a configuration of an image coding device.

FIG. 4 illustrates a configuration example of an image coding device of an embodiment. An image coding device 401 illustrated in FIG. 4 includes a generation circuit 411, a storage circuit 412 and a coding circuit 413. FIG. 5 is a flowchart illustrating an example of a palette generation process executed by the image coding device 401 illustrated in FIG. 4.

The generation circuit 411 first generates first palette information from a decoded image of a first block used for predicting second palette information of a second block in a coding target image when the first block has not received palette coding (step 501). Then, the generation circuit 411 stores the first palette information in the storage circuit 412 (step 502). Next, the coding circuit 413 uses the first palette information stored in the storage circuit 412 so as to perform the prediction coding on the second palette information by using the first palette information stored in the storage circuit 412, and thereby generates coded palette information (step 530).

Figure 7:
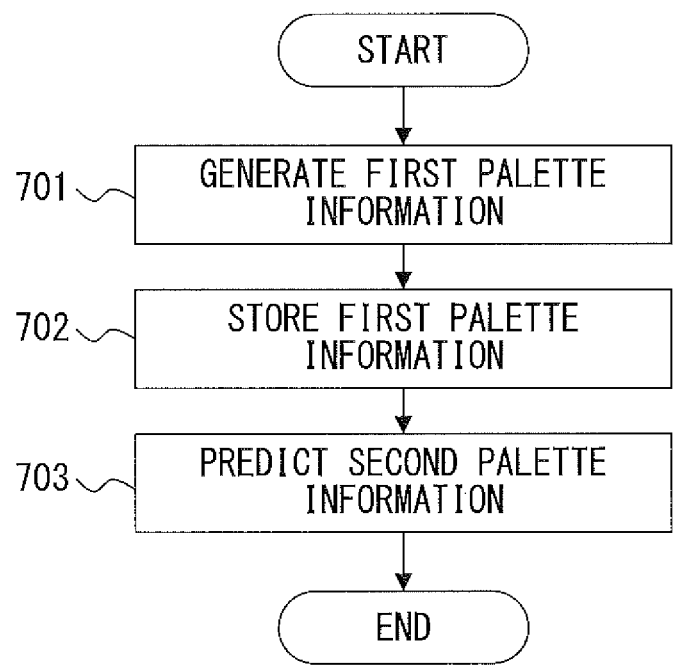
FIG. 7 is a flowchart illustrating an image decoding process.

FIG. 6 illustrates a configuration example of an image decoding device of an embodiment. An image decoding device 601 illustrated in FIG. 6 includes a generation circuit 611, a storage circuit 612 and a prediction circuit 613. FIG. 7 is a flowchart illustrating an example of a palette prediction process executed by the image decoding device 601.

The generation circuit 611 first generates first palette information from a decoded image of a first block used for predicting second palette information of a second block in a decoding target image when the first block has not received palette coding (step 701). Then, the generation circuit 611 stores the first palette information in the storage circuit 612 (step 702). Next, the prediction circuit 613 uses the first palette information stored in the storage circuit 612, and thereby predicts the second palette information (step 703).

The image coding device 401 illustrated in FIG. 4 or the image decoding device 601 illustrated in FIG. 6 can compress an image efficiently even when a block used for predicting palette information has not received the palette coding.

The image coding device 401 and the image decoding device 601 can be used for various applications. For example, the image coding device 401 or the image decoding device 601 can be embedded in a video camera, a video transmission device, a video reception device, a videophone system, a computer or a mobile phone.

Figure 8:
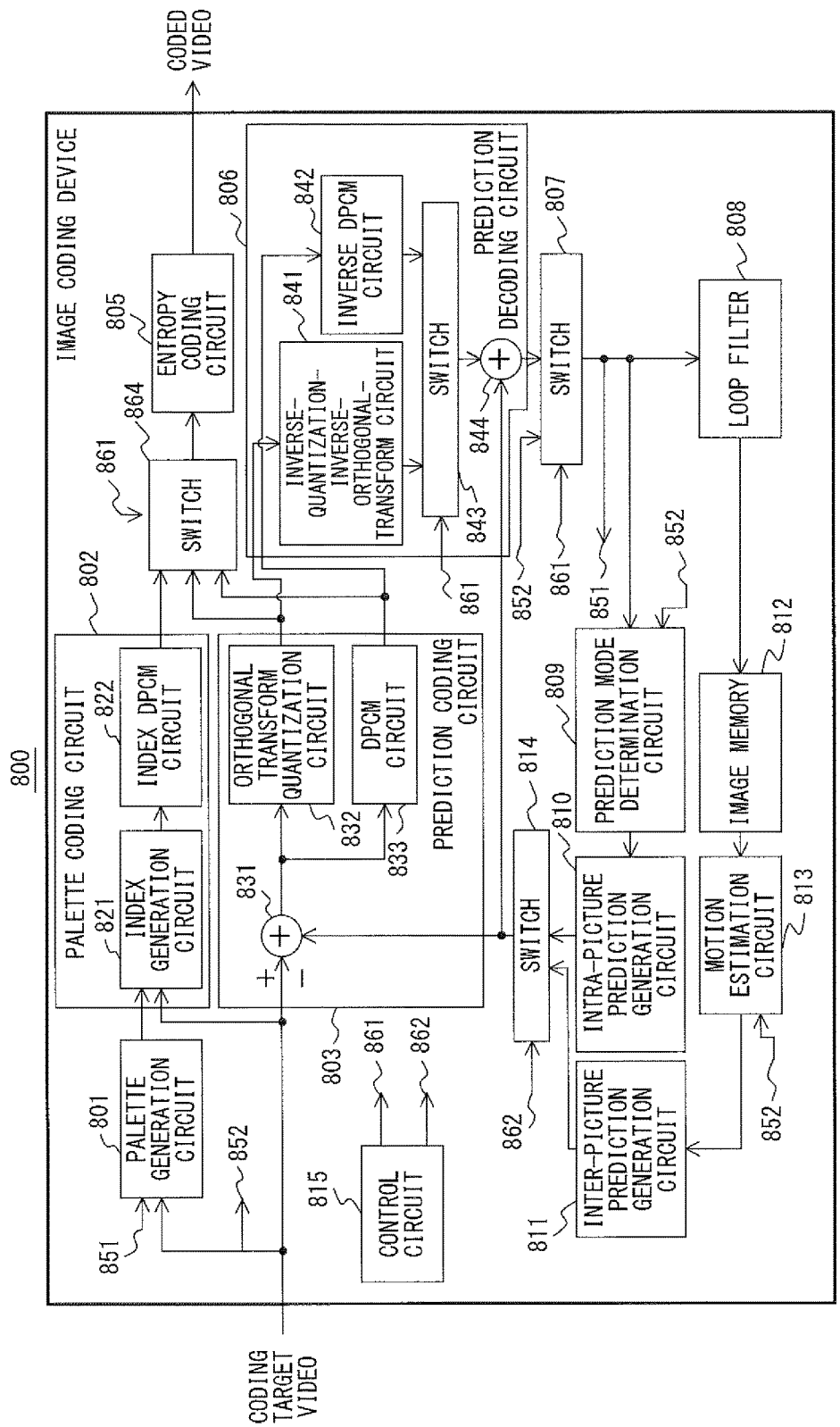
FIG. 8 illustrates a specific example of an image coding device.

FIG. 8 illustrates a specific example of the image coding device 401 illustrated in FIG. 4. An image coding device 800 illustrated in FIG. 8 includes a palette generation circuit 801, a palette coding circuit 802, a prediction coding circuit 803, a switch 804, an entropy coding circuit 805 and a prediction decoding circuit 806. The image coding device 800 further includes a switch 807, a loop filter 808, a prediction mode determination circuit 809, an intra-picture prediction generation circuit 810, an inter-picture prediction generation circuit 811, an image memory 812, a motion estimation circuit 813, a switch 814 and a control circuit 815.

The image coding device 800 can be implemented as for example a hardware circuit. In such a case, the image coding device 800 may include the respective constituents as individual circuits or may be configured as a single integrated circuit.

The image coding device 800 codes an input coding target video so as to output the coded video. The coding target video includes a plurality of pictures. Each picture corresponds to a coding target image (coding target picture), and may be a color image or may be a monochrome image. When the picture is a color image, the pixel value may be in the RGB format or may be in the YUV format. When the pixel value is in the YUV format, the color difference format may be 4:4:4, 4:2:2 or 4:2:0

Figure 9:
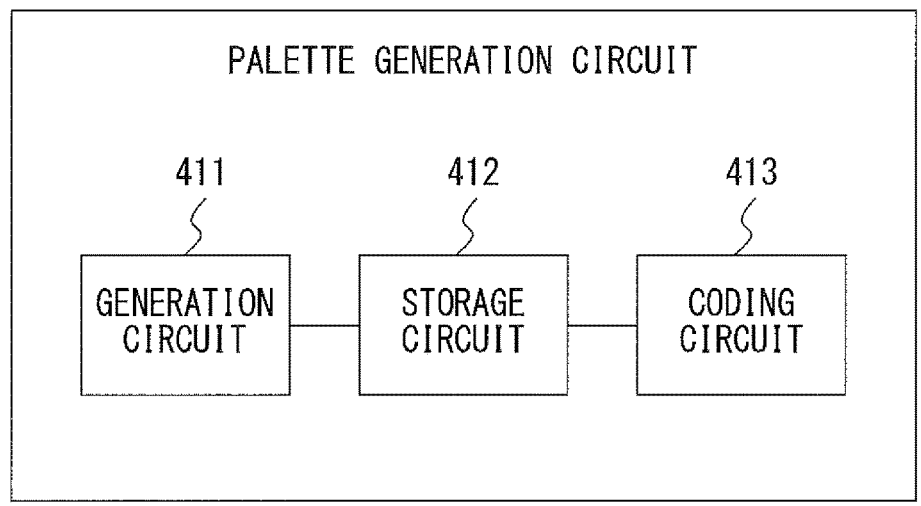
FIG. 9 illustrates a configuration of a palette generation circuit in an image coding device.

As illustrated in FIG. 9, the palette generation circuit 801 includes the generation circuit 411, the storage circuit 412 and the coding circuit 413 illustrated in FIG. 4. The palette generation circuit 801 generates palette information of a process block from a pixel value 852 included in an image of the process block in the coding target picture included in the coding target video. Also, the palette generation circuit 801 generates palette information of an adjoining block from a pixel value 851 included in a local decoded image of the adjoining block output from the switch 807.

The palette generation circuit 801 explicitly codes the palette information of the process block and thereby can generate coded palette information. Also, the palette generation circuit 801 performs prediction coding on the palette information of the process block by using the palette information of the adjoining block, and thereby can also generate coded palette information.

When the process block is to receive palette coding, the palette generation circuit 801 stores the palette information of the process block in the storage circuit 412 and outputs the palette information used for the palette coding and the coded palette information to the palette coding circuit 802.

The palette coding circuit 802 includes an index generation circuit 821 and an index DPCM circuit 822. The index generation circuit 821 uses the palette information output from the palette generation circuit 801 so as to convert the pixel values of the process block into indexes. The index DPCM circuit 822 performs DPCM coding on the indexes of the process block, and outputs the signal of the coded image that received palette coding and the coded palette information to the switch 804.

The prediction coding circuit 803 includes a subtracter 831, an orthogonal transform quantization circuit 832, and a DPCM circuit 833. The subtracter 831 generates a prediction error by subtracting a predicted pixel value output from the switch 814 from the pixel value 852 of the image of the process block. The orthogonal transform quantization circuit 832 performs an orthogonal transform and quantization on the prediction error output form the subtracter 831, and outputs the signal of the coded image that received the prediction coding. The DPCM circuit 833 performs DPCM coding on the prediction error so as to output the signal of the coded image that received the prediction coding.

The switch 804 selects a signal output from the index DPCM circuit 822, the orthogonal transform quantization circuit 832 or the DPCM circuit 833 in accordance with a control signal 861 output from the control circuit 815, and outputs the selected signal to the entropy coding circuit 805.

When the coding mode for the process block is the palette coding mode, the control signal 861 represents the palette coding mode. When the coding mode for the process block is the intra prediction coding mode, the control signal 861 represents either the orthogonal transform coding mode or the DPCM coding mode. When the coding mode for the process block is the inter prediction coding mode as well, the control signal 861 represents either the orthogonal transform coding mode or the DPCM coding mode. The intra prediction coding mode and the inter prediction coding mode correspond to a coding mode other than the palette coding mode.

When the control signal 861 represents the palette coding mode, the switch 804 selects a signal output from the index DPCM circuit 822. When the control signal 861 represents the orthogonal transform coding mode, the switch 804 selects a signal output from the orthogonal transform quantization circuit 832. When the control signal 861 represents the DPCM coding mode, the switch 804 selects a signal output from the DPCM circuit 833.

The prediction decoding circuit 806 includes an inverse-quantization-inverse-orthogonal-transform circuit 841, an inverse DPCM circuit 842, a switch 843 and an adder 844. The inverse-quantization-inverse-orthogonal-transform circuit 841 performs inverse quantization and an inverse orthogonal transform on a signal output from the orthogonal transform quantization circuit 832 so as to output a prediction error. The inverse DPCM circuit 842 performs inverse DPCM coding on a signal output from the DPCM circuit 833 so as to output a prediction error.

In accordance with the control signal 861 output from the control circuit 815, the switch 843 selects a prediction error output from either the inverse-quantization-inverse-orthogonal-transform circuit 841 or the inverse DPCM circuit 842 so as to output the selected prediction error to the adder 844.

When the control signal 861 represents the palette coding mode, the operations of the switch 843 are not defined. When the control signal 861 represents the orthogonal transform coding mode, the switch 843 selects a prediction error output from the inverse-quantization-inverse-orthogonal-transform circuit 841. When the control signal 861 represents the DPCM coding mode, the switch 843 selects a prediction error output from the inverse DPCM circuit 842.

The adder 844 adds a predicted pixel value output form the switch 814 to a prediction error output from the switch 843, and generates a pixel value of the local decoded image so as to output the pixel value.

In accordance with the control signal 861 output from the control circuit 815, the switch 807 selects either the pixel value 852 of the image of the process block or the pixel value output from the adder 844, and outputs the selected pixel value as the pixel value 851 of the local decoded image.

When the control signal 861 represents the palette coding mode, the switch 807 selects the pixel value 852 of the image of the process block. This pixel value 852 corresponds to the pixel value of a lossless local decoded image. When the control signal 861 represents the orthogonal transform coding mode or the DPCM coding mode, the switch 807 selects a pixel value output from the adder 844.

The prediction mode determination circuit 809 performs intra prediction mode determination by using the pixel values 851 and 852 so as to determine the optimum prediction mode, and outputs the optimum prediction mode to the intra-picture prediction generation circuit 810. The intra-picture prediction generation circuit 810 uses the optimum prediction mode so as to generate an intra-picture predicted pixel value.

The loop filter 808 applies a filter process for removing edge distortions to the pixel value 851 so as to output the filtered pixel value to the image memory 812. The image memory 812 stores the pixel value output from the loop filter 808 as the local decoded image of a reference picture. The motion estimation circuit 813 performs motion estimation by using the pixel value of the local decoded image stored in the image memory 812 and the pixel value 852, and generates a motion vector of the process block. The inter-picture prediction generation circuit 811 uses the motion vector so as to generate an inter-picture predicted pixel value.

In accordance with a control signal 862 output from the control circuit 815, the switch 814 selects a predicted pixel value output from either the intra-picture prediction generation circuit 810 or the inter-picture prediction generation circuit 811 so as to output the selected pixel value. The control signal 862 represents whether the coding mode for the process block is the intra prediction coding mode or the inter prediction coding mode.

When the control signal 862 represents the intra prediction coding mode, the switch 814 selects a predicted pixel value output from the intra-picture prediction generation circuit 810. When the control signal 862 represents the inter prediction coding mode, the switch 814 selects a predicted pixel value output from the inter-picture prediction generation circuit 811.

The entropy coding circuit 805 performs, for each block, entropy coding on coding mode information, coded image, coded palette information, prediction mode information and motion vector information, and outputs the coded video.

Coding mode information represents for example the palette coding mode, the orthogonal transform coding mode or the DPCM coding mode. When the coding mode is the orthogonal transform coding mode or the DPCM coding mode, the coding mode information further represents the intra prediction coding mode or the inter prediction coding mode.

When the coding mode information represents the palette coding mode, a coded image corresponds to a coded image output from the index DPCM circuit 822. When the coding mode information represents the orthogonal transform coding mode, a coded image corresponds to a coded image output from the orthogonal transform quantization circuit 832. When the coding mode information represents the DPCM coding mode, a coded image corresponds to a coded image output from the DPCM circuit 833.

Coded palette information is included in a coded video when the coding mode information represents the palette coding mode, and includes for example the following pieces of information.

(1) Index number information, which represents the number of indexes in the palette (2) Prediction flag, which represents whether or not prediction coding has been performed for the palette information (3) Prediction direction flag, which represents an adjoining block used for prediction coding from among a plurality of adjoining blocks (4) Palette information A prediction direction flag of (3) above is included in coded palette information when prediction coding has been performed on palette information. Index number information of (1) above and palette information of (4) above are included in coded palette information when prediction coding has not been performed on the palette information. Coded palette information is transferred from the palette generation circuit 801 to the entropy coding circuit 805 via the palette coding circuit 802 and the switch 804.

Prediction mode information represents an optimum prediction mode determined by the prediction mode determination circuit 809, and is included in a coded video when the coding mode information represents the intra prediction coding mode. Motion vector information represents a motion vector generated by the motion estimation circuit 813, and is included in a coded video when the coding mode information represents the inter prediction coding mode.

The palette generation circuit 801 can generates coded palette information on the basis of a syntax based on for example the HEVC.

FIG. 10 illustrates an example of a structure of a sequence parameter set (SeqParameterSetRbsp) that describes parameters common in one sequence including a plurality of pictures.

PaletteCodingEnabledFlag is a syntax newly added to the HEVC, and represents whether or not to validate palette coding. When PaletteCodingEnabledFlag is "1", palette coding is validated, while when PaletteCodingEnabledFlag is "0", palette coding is invalidated.

FIG. 11 illustrates an example of a structure of a coding unit (CU), which is the minimum unit for switching the coding modes. A CU corresponds to for example a block in a coding target picture. Explanations will be given below for syntaxes that are newly added to the HEVC.

PaletteCodingFlag is a flag representing whether or not to perform palette coding on a CU, and is valid only when PaletteCodingEnabledFlag is "1". When PaletteCodingFlag is "1", palette coding is performed and when PaletteCodingFlag is "0", palette coding is not performed.

PalettePredictionFlag is a flag representing whether or not to perform prediction coding on palette information, and corresponds to the prediction flag of (2) above. PalettePredictionFlag is valid only when PaletteCodingFlag is "1". When PalettePredictionFlag is "1", prediction coding is performed on palette information and when PalettePredictionFlag is "0", prediction coding is not performed on palette information.

PalettePredFromLeftFlag is a flag representing whether or not to predict palette information from the CU adjoining on the left, and corresponds to the prediction direction flag of (3) above. PalettePredFromLeftFlag is valid only when PalettePredictionFlag is "1". When PalettePredFromLeftFlag is "1", the palette information is predicted from the CU adjoining on the left and when PalettePredFromLeftFlag is "0", the palette information is predicted from the CU adjoining on the above.

PaletteSizeMinus1 represents a value resulting from subtracting one from the number of indexes of the palette information, and corresponds to the index number information of (1) above. PaletteSizeMinus1 is valid only when PaletteCodingFlag is "1".

When PalettePredictionFlag is "0", PaletteSizeMinus1 is explicitly coded. When PalettePredictionFlag is "1", the value of PaletteSizeMinus1 of the adjoining CU represented by PalettePredFromLeftFlag is used as PaletteSizeMinus1.

Palette [i] [cIdx] represents the pixel value of the cIdx-th color component (cIdx=0, 1, 2) in the i-th entry in the palette (i is an integer equal to or greater than zero), and corresponds to the palette information of (4) above. When for example the pixel value is in the RGB format, the 0-th color component is R, the first color component is G and the second color component is B.

When PalettePredictionFlag is "0", Palette [i] [cIdx] is coded explicitly. When cIdx is "0", difference encoding of Palette [i] [0] is performed by using Palette [i−1] [0] in the (i−1) th entry.

When PalettePredictionFlag is "1", the value of Palette [i] [cIdx] of the adjoining CU represented by PalettePredFromLeftFlag is used as Palette [i] [cIdx].

PaletteIdx [i] represents the index corresponding to the in-th pixel of the CU (i is an integer equal to or greater than zero). PaletteMap [i % nCbS][i/nCbS] is a two-dimensional array on which PaletteIdx [i] is mapped.

FIG. 12 illustrates another example of a structure of a CU. In the example illustrated in FIG. 12, differently from the example illustrated in FIG. 11, difference encoding of Palette [i] [0] is not performed even when cIdx is "0".

Figure 13A:
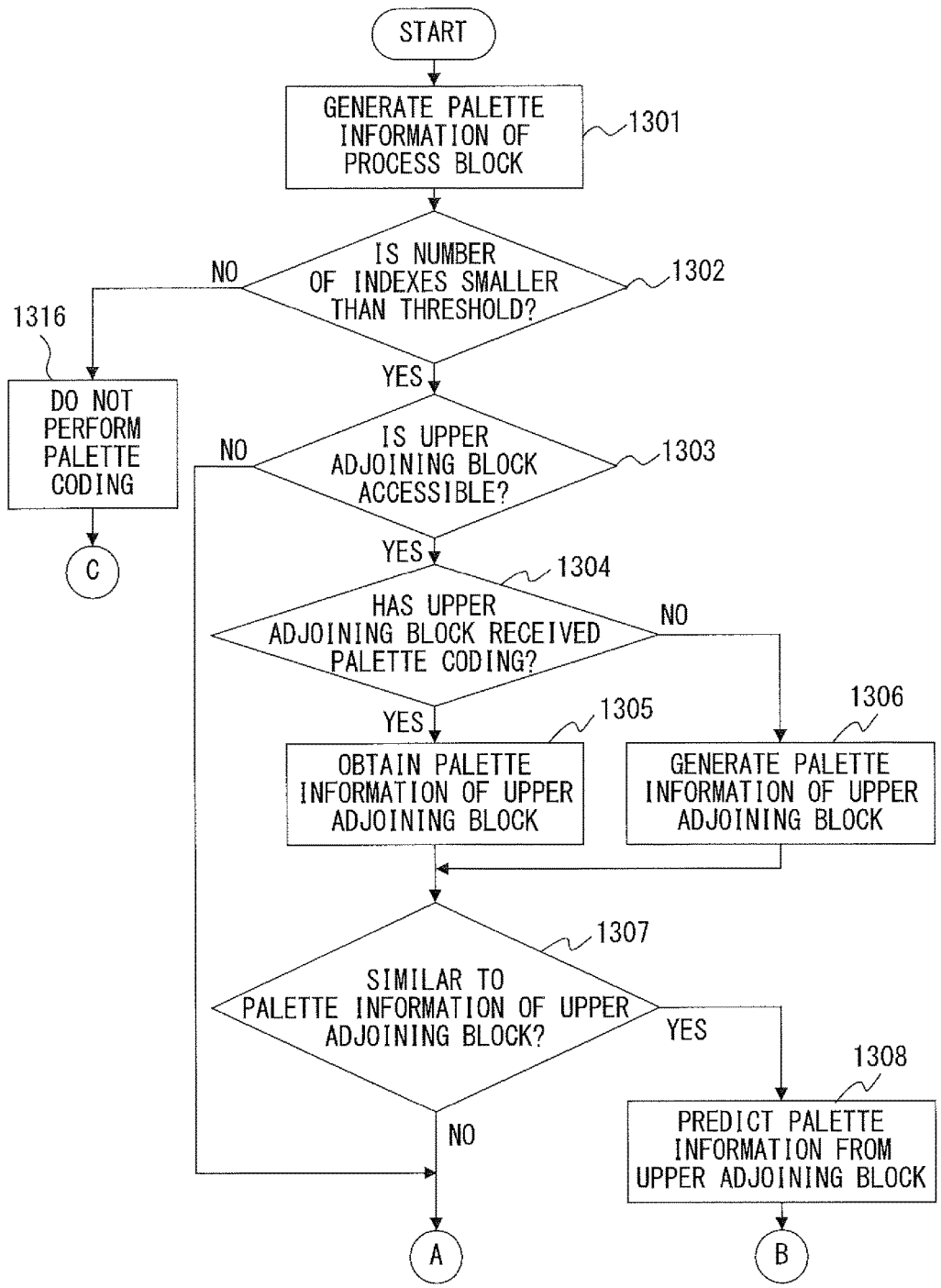
FIG. 13A is a first part of a flowchart illustrating a palette information coding process.
Figure 13B:
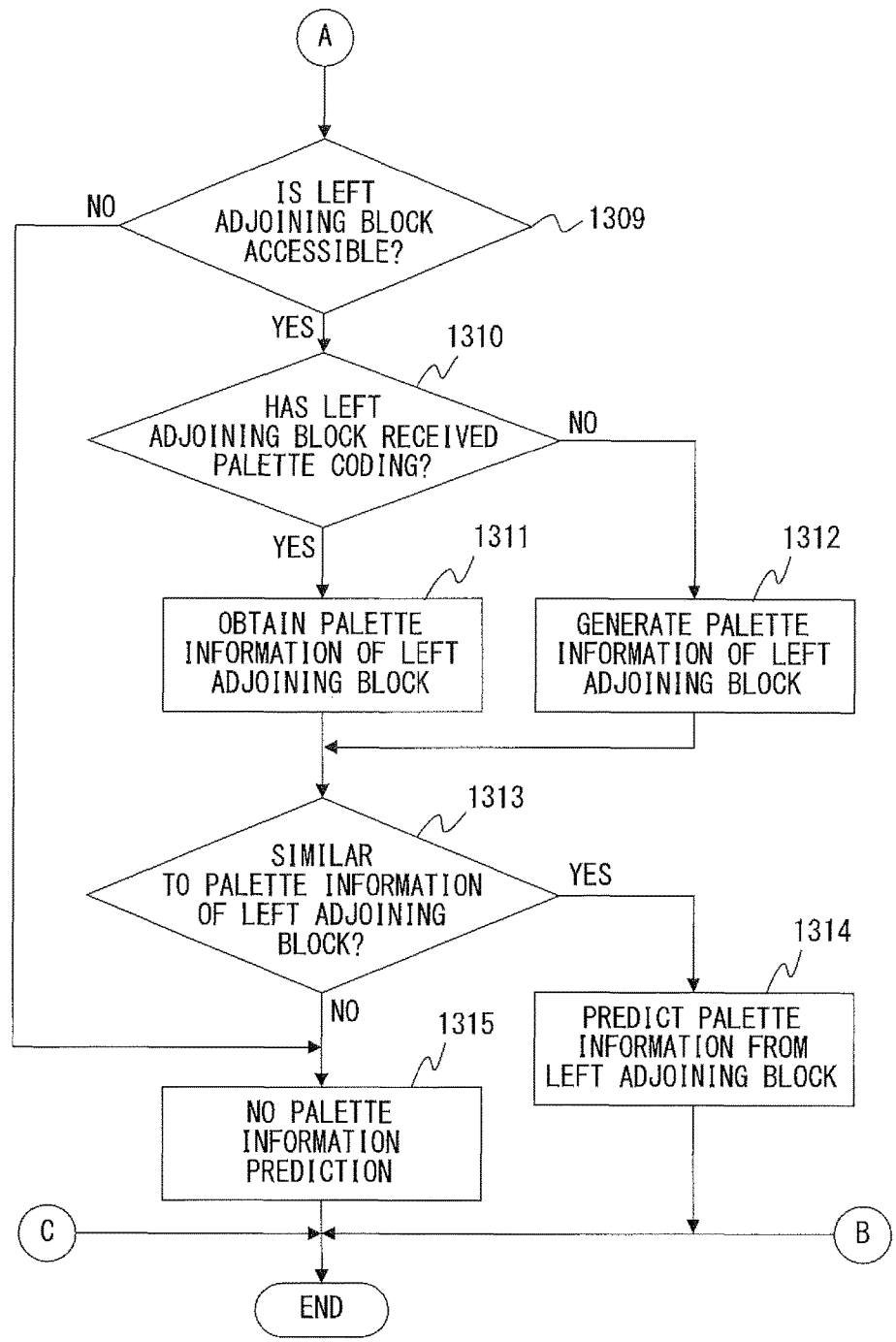
FIG. 13B is a second part of a flowchart illustrating a palette information coding process.

FIG. 13A and FIG. 13B are flowcharts illustrating an example of a palette information coding process executed by the palette generation circuit 801 illustrated in FIG. 8.

First, the generation circuit 411 illustrated in FIG. 9 generates palette information of a process block from the pixel values of the process block, and stores the palette information in the storage circuit 412 (step 1301).

Next, the coding circuit 413 compares the number of indexes N of the palette information of the process block with threshold Th (step 1302). Th can be determined on the basis of the size of for example a process block. When a process block is for example 8×8 blocks, Th may be 16.

When N is smaller than Th (YES in step 1302), the coding circuit 413 determines whether or not the coded upper adjoining block is accessible (step 1303).

In video coding in some cases, one picture is divided into a plurality of blocks and a slice including a plurality of blocks is formed. One picture is divided into one or more slices. When an adjoining block exists in a picture and in the same slice as a process block, that adjoining block is determined to be accessible.

When the upper adjoining block is accessible (YES in step 1303), the coding circuit 413 determines whether or not the upper adjoining block has received palette coding (step 1304). When the upper adjoining block has received palette coding (YES in step 1304), the coding circuit 413 obtains the palette information of the upper adjoining block that is stored in the storage circuit 412.

When upper adjoining block has not received palette coding (NO in step 1304), the generation circuit 411 generates palette information of the upper adjoining block from the pixel values of the local decoded image of the upper adjoining block, and stores the palette information in the storage circuit 412 (step 1306).

Next, the coding circuit 413 compares the palette information of the process block with the palette information of the upper adjoining block and determines whether or not these two pieces of palette information are similar to each other (step 1307). When for example the following conditions are met, it is determined that the palette information of the process block and the palette information of the upper adjoining block are similar.

(a) The number of indexes of the palette information of the upper adjoining block is smaller than Th.

(b) The number of indexes of the palette information of the process block is equal to or smaller than the number of indexes of the palette information of the upper adjoining block.

(c) The pixel value of each entry of the palette information of the process block is equal to the pixel value of one of the entries of the palette information of the upper adjoining block.

When the palette information of the process block and the palette information of the upper adjoining block are similar (YES in step 1307), the coding circuit 413 determines to predict the palette information of the process block from the upper adjoining block. Then, by setting the prediction flag to "1" and the prediction direction flag to "0", the coding circuit 413 performs prediction coding on the palette information of the process block so as to generate coded palette information.

In such a case, the coding circuit 413 reports to the control circuit 815 that palette coding is to be performed on the process block, and the control circuit 815 selects the palette coding mode as the coding mode for the process block.

When the palette information of the process block and the palette information of the upper adjoining block are not similar to each other (NO in step 1307), the coding circuit 413 determines whether or not the coded left adjoining block is accessible (step 1309).

When the left adjoining block is accessible (YES in step 1309), the coding circuit 413 determines whether or not the left adjoining block has received palette coding (step 1310). When the left adjoining block has received palette coding (YES in step 1310), the coding circuit 413 obtains the palette information of the left adjoining block stored in the storage circuit 412 (step 1311).

When the left adjoining block has not received palette coding (NO in step 1310), the generation circuit 411 generates palette information of the left adjoining block from the pixel value of the local decoded image of the left adjoining block (step 1312).

Next, the coding circuit 413 compares the palette information of the process block with the palette information of the left adjoining block and determines whether or not these two pieces of palette information are similar to each other (step 1313).

When the palette information of the process block and the palette information of the left adjoining block are similar (YES in step 1313), the coding circuit 413 determines to predict the palette information of the process block from the left adjoining block (step 1314). Then, by setting the prediction flag to "1" and the prediction direction flag to "1", the coding circuit 413 performs prediction coding on the palette information of the process block so as to generate coded palette information.

In such a case, the coding circuit 413 reports to the control circuit 815 that palette coding is to be performed on the process block, and the control circuit 815 selects the palette coding mode as the coding mode for the process block.

When the palette information of the process block and the palette information of the left adjoining block are not similar to each other (NO in step 1313), the coding circuit 413 determines to not predict the palette information of the process block from an adjoining block (step 1315). Then, by setting the prediction flag to "0", coding the palette information of the process block explicitly and setting the index number information that represents the number of indexes of palette information, the coding circuit 413 generates coded palette information.

In such a case, the coding circuit 413 reports to the control circuit 815 that palette coding is to be performed on the process block, and the control circuit 815 selects the palette coding mode as the coding mode for the process block.

When the upper adjoining block is not accessible (NO in step 1303), the coding circuit 413 performs the processes in and after step 1309, while when the left adjoining block is not accessible (NO in step 1309), the coding circuit 413 performs the process in step 1315.

When N is equal to or greater than Th (NO in step 1302), the coding circuit 413 reports to the control circuit 815 that palette coding is not to be performed on the process block (step 1316). In such a case, the control circuit 815 selects a coding mode other than the palette coding mode as the coding mode for the process block.

When performing palette coding on the process block, the coding circuit 413 outputs generated coded palette information to the palette coding circuit 802 together with the palette information of the process block.

FIG. 14 is a flowchart illustrating an example of a palette information generation process executed by the generation circuit 411 in step 1301 or 51306 illustrated in FIG. 13A or in step 1312 illustrated in FIG. 13B. In this palette information generation process, an image of a process block, a local decoded image of the upper adjoining block or a local decoded image of the left adjoining block is used as a process target image.

The generation circuit 411 first initializes a palette so as to generate a palette that does not include entries (step 1401). Next, the generation circuit 411 extracts the pixel value of one pixel from a process target image (step 1402).

Next, the generation circuit 411 checks whether or not an entry having the same pixel value as the extracted pixel value exists in the palette (step 1403). When an entry having the same pixel value does not exist in the palette (NO in step 1403), the generation circuit 411 adds one entry to the palette (step 1404), and registers the extracted pixel value in that entry (step 1405).

Next, the generation circuit 411 checks whether or not an unprocessed pixel remains in the process target image (step 1406), and when an unprocessed pixel remains (YES in step 1406), the generation circuit 411 repeats the processes in and after step 1402 on the next pixel.

Also, when an entry having the same pixel value exists in the palette (YES in step 1403), the generation circuit 411 repeats the processes in and after step 1402 on the next pixel.

When an unprocessed pixel does not remain (NO in step 1406), the generation circuit 411 sorts one or more entries in the palette in accordance with a prescribed algorithm (step 1407). Then, the generation circuit 411 outputs the palette information that has received the sorting as palette information of the process target image (step 1408).

An example of a prescribed algorithm may be descending order or ascending order of pixel values included in the entries. Descending or ascending order of the appearance frequency of each pixel value in the process target image may be used or descending or ascending order of similarity between each pixel value and an adjoining pixel value in the process target image may be used.

By sorting the entries in the palette in accordance with a prescribed algorithm, palette information can be generated from pixel values by using a unique algorithm. It is desirable that this algorithm be identical to the algorithm used by the image decoding device for generating palette information.

When for example the pixel value is in the RGB format, the pixel value of the n-th entry can be described as (R[n], G [n], B [n]), where n is an integer equal to or greater than zero and equal to or smaller than (N−1) on an assumption that N is the number of entries of the palette information.

As an example, explanations will be given for a case when palette information before receiving sorting includes the following four entries.

(R[0], G[0], B[0])=(100, 200, 10)
(R[1], G[1], B[1])=(80, 100, 100)
(R[2], G[2], B[2])=(120, 210, 10)
(R[3], G[3], B[3])=(80, 100, 90)

Sorting these pieces of palette information in ascending order of the pixel values in accordance with the priority order of color components R, G and B results in the following palette information.

(R[0], G[0], B[0])=(80, 100, 90)
(R[1], G[1], B[1])=(80, 100, 100)
(R[2], G[2], B[2])=(100, 200, 10)
(R[3], G[3], B[3])=(120, 210, 10)

In this case, all the entries are first sorted in ascending order of color component R, and entries having the pixel value for same color component R are sorted in ascending order of color component G. Then, entries having the same pixel values for color components R and G are sorted in ascending order of color component B. For example, (80, 100, 90) and (80, 100, 100) have the same pixel values for color components R and G, and thus are sorted in ascending order of color component B.

Sorting the entries in ascending order of color component R makes it easy to perform difference encoding of Palette [i] [0] as explained in the example illustrated in FIG. 11. In the example illustrated in FIG. 12 by contrast, difference encoding of Palette [i] [0] is not performed, and thus the entries do not have to be sorted in ascending order of color component R.

The index generation circuit 821 of the palette coding circuit 802 replaces pixel values of the process block with the indexes of the entries corresponding to those pixel values from among indexes included in the palette information of the process block. The index DPCM circuit 822 can apply for example DPCM coding as follows on the indexes in of the process block.

I'[x]=I[x] if (x==0)
I'[x]=I[x]−I[x−1] if (x!=0&&x<M)

I[x] represents the value of the x-th index in the process block, I'[x] represents the value of the x-th index after receiving the DPCM coding, and M represents the total number of the pixels in the process block.

Figure 15:
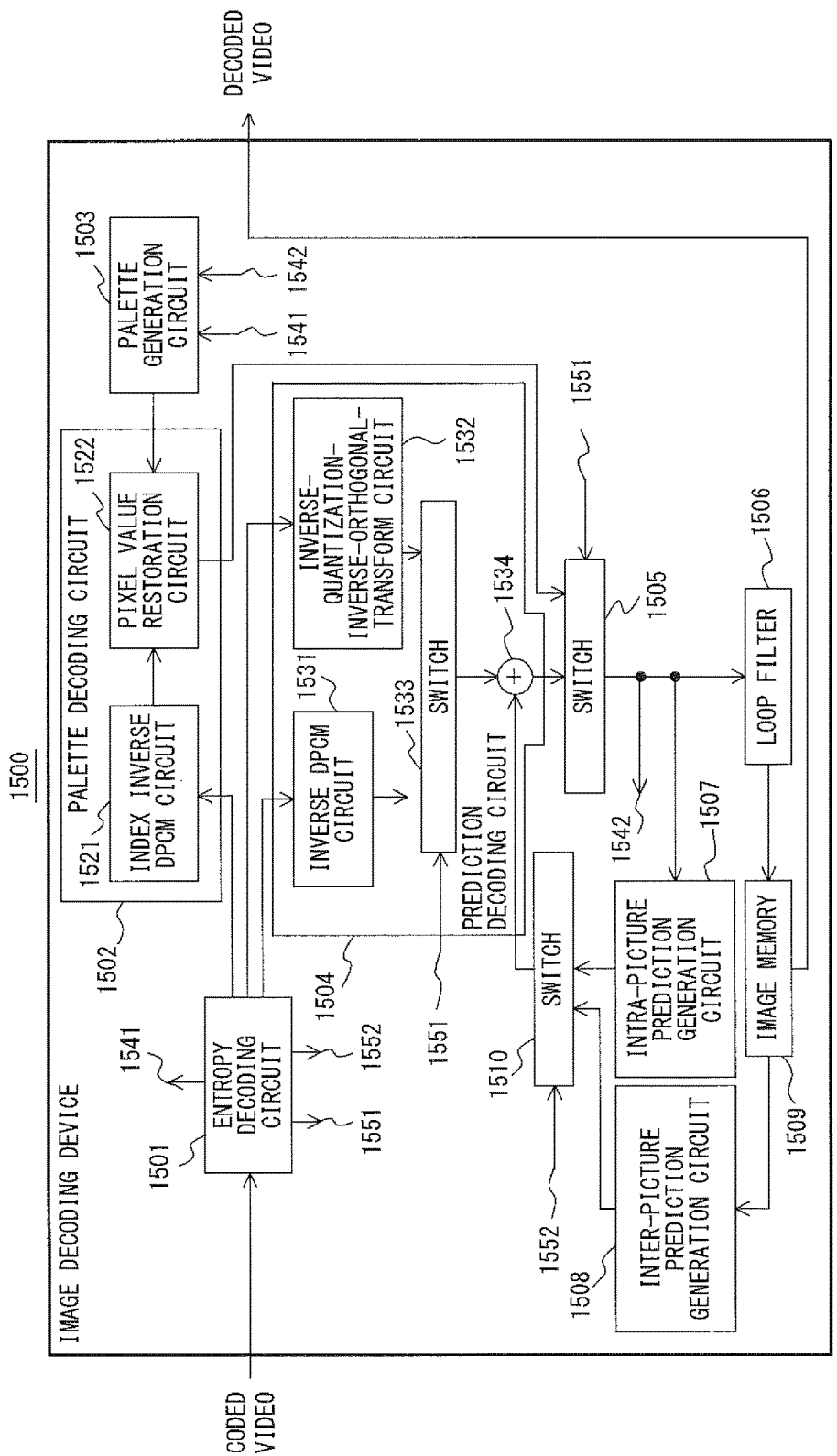
FIG. 15 illustrates a specific example of an image decoding device.

FIG. 15 illustrates a specific example of the image decoding device 601 illustrated in FIG. 6. An image decoding device 1500 illustrated in FIG. 15 includes an entropy decoding circuit 1501, a palette decoding circuit 1502, a palette generation circuit 1503, a prediction decoding circuit 1504. The image decoding device 1500 further includes a switch 1505, a loop filter 1506, an intra-picture prediction generation circuit 1507, an inter-picture prediction generation circuit 1508, an image memory 1509, and a switch 1510.

The image decoding device 1500 can be implemented as for example a hardware circuit. In such a case, the image decoding device 1500 may include the respective constituents as individual circuits or may be a single integrated circuit.

The image decoding device 1500 decodes an input coded video so as to output the decoded video. The coded video includes a plurality of coded images. Each coded image corresponds to a decoding target image.

The entropy decoding circuit 1501 performs entropy decoding on coded video, and generates, for each of the blocks of each decoding target image, coding mode information, a coded image, coded palette information 1541, prediction mode information and motion vector information. Then, the entropy decoding circuit 1501 outputs control signals 1551 and 1552, which represent the coding modes for the process block.

The control signal 1551 represents whether the coding mode for the process block is the palette coding mode, the orthogonal transform mode or the DPCM coding mode, while the control signal 1552 represents whether the coding mode for the process block is the intra prediction coding mode or the inter prediction coding mode.

When the coding mode for the process block is the palette coding mode, the coded image is a coded image obtained by palette coding, and is output to the palette decoding circuit 1502. When the coding mode for the process block is the orthogonal transform coding mode, the coded image is a coded image obtained by prediction coding, and is output to an inverse-quantization-inverse-orthogonal-transform circuit 1532 of the prediction decoding circuit 1504. When the coding mode for the process block is the DPCM coding mode, the coded image is a coded image obtained by prediction coding, and is output to an inverse DPCM circuit 1531 of the prediction decoding circuit 1504.

The coded palette information 1541 is included in a coded video when the coding mode for the process block is the palette coding mode, and is output to the palette generation circuit 1503. The prediction mode information is included in a coded video when the coding mode for the process block is the intra prediction coding mode, and is output to the intra-picture prediction generation circuit 1507. The motion vector information is included in a coded video when the coding mode for the process block is the inter prediction coding mode, and is output to the inter-picture prediction generation circuit 1508.

The palette decoding circuit 1502 includes an index inverse DPCM circuit 1521 and a pixel value restoration circuit 1522. The index inverse DPCM circuit 1521 performs inverse DPCM coding on an index, that has received DPCM coding, included in a coded image in the process block so as to restore the index, the coded image having received palette coding. The inverse DPCM coding process is a process in which the DPCM coding process performed by the index DPCM circuit 822 in FIG. 8 is performed in the inverse manner.

The pixel value restoration circuit 1522 uses the palette information of the process block output from the palette generation circuit 1503 so as to generate the pixel values of the decoded image of the process block from the restored indexes, and outputs the pixel values. In the above process, the pixel value restoration circuit 1522 converts each index into the pixel value registered in the corresponding entry in the palette, and thereby restores the pixel values of the process block.

Figure 16:
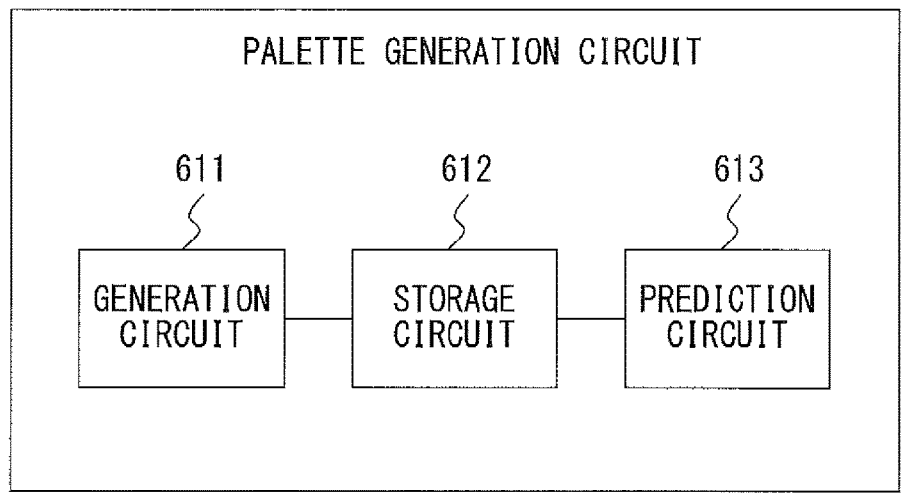
FIG. 16 illustrates a configuration of a palette generation circuit in an image decoding device.

As illustrated in FIG. 16, the palette generation circuit 1503 includes the generation circuit 611, the storage circuit 612 and the prediction circuit 613 illustrated in FIG. 6. The palette generation circuit 1503 generates palette information of the process block from the coded palette information 1541 or from a pixel value 1542 included in the decoded image of the adjoining block output from the switch 1505, and thereafter outputs the palette information to the palette decoding circuit 1502.

The prediction decoding circuit 1504 includes an inverse DPCM circuit 1531, an inverse-quantization-inverse-orthogonal-transform circuit 1532, a switch 1533 and an adder 1534. The inverse DPCM circuit 1531 performs inverse DPCM coding on a prediction error, that has received DPCM coding, included in the coded image of the process block so as to restore a prediction error, the coded image having received prediction coding. The inverse DPCM coding process is a process in which the DPCM coding process performed by the DPCM circuit 833 in FIG. 8 is performed in the inverse manner. The inverse-quantization-inverse-orthogonal-transform circuit 1532 performs inverse quantization and an inverse orthogonal transform on a prediction error, that has received an orthogonal transform and quantization, included in a coded image of the process block so as to restore the prediction error, the coded image having received prediction coding.

In accordance with the control signal 1551 output from the entropy decoding circuit 1501, the switch 1533 selects a prediction error output from either the inverse DPCM circuit 1531 or the inverse-quantization-inverse-orthogonal-transform circuit 1532 so as to output the selected error to the adder 1534.

When the control signal 1551 represents the palette coding mode, the operations of the switch 1533 are not defined. When the control signal 1551 represents the orthogonal transform coding mode, the switch 1533 selects a prediction error output from the inverse-quantization-inverse-orthogonal-transform circuit 1532. When the control signal 1551 represents the DPCM coding mode, the switch 1533 selects a prediction error output from the inverse DPCM circuit 1531.

The adder 1534 adds a predicted pixel value output form the switch 1510 to a prediction error output from the switch 1533, and generates a pixel value of the decoded image of the process block so as to output the pixel value.

In accordance with the control signal 1551, the switch 1505 selects a pixel value output from either the palette decoding circuit 1502 or the prediction decoding circuit 1504, and outputs the selected pixel value as the pixel value 1542 of the decoded image.

When the control signal 1551 represents the palette coding mode, the switch 1505 selects the pixel value output from the palette decoding circuit 1502. When the control signal 1551 represents the orthogonal transform coding mode or the DPCM coding mode, the switch 1505 selects a pixel value output from the prediction decoding circuit 1504.

The loop filter 1506 applies a filter process for removing edge distortions to the pixel value 1542 so as to output the filtered pixel value to the image memory 1509. The image memory 1509 stores the pixel value output from the loop filter 1506 as the decoded image of a reference picture. The decoded image stored in the image memory 1509 is output as a decoded video.

The inter-picture prediction generation circuit 1508 uses the decoded image of the reference picture and the motion vector represented by the motion vector information output from the entropy decoding circuit 1501, and thereby generates an inter picture predicted pixel value.

The intra-picture prediction generation circuit 1507 uses the pixel value 1542 of the decoded image and the optimum prediction mode specified by the prediction mode information output from the entropy decoding circuit 1501, and generates an intra picture prediction pixel.

In accordance with the control signal 1552 output from the entropy decoding circuit 1501, the switch 1510 selects a predicted pixel value output from either the intra-picture prediction generation circuit 1507 or the inter-picture prediction generation circuit 1508 so as to output the selected pixel value.

When the control signal 1552 represents the intra prediction coding mode, the switch 1510 selects a predicted pixel value output form the intra-picture prediction generation circuit 1507. When the control signal 1552 represents the inter prediction coding mode, the switch 1510 selects a predicted pixel value output from the inter-picture prediction generation circuit 1508.

FIG. 17 is a flowchart illustrating an example of a palette information generation process executed by the palette generation circuit 1503 illustrated in FIG. 15.

First, the generation circuit 611 illustrated in FIG. 16 obtains the coded palette information 1541 output from the entropy decoding circuit 1501 (step 1701). Then, in accordance with the prediction flag included in the coded palette information 1541, the generation circuit 611 determines whether or not the palette information of the process block has received prediction coding. When the prediction flag is "1", the palette information is determined to have received prediction coding while when the prediction flag is "0", the palette information is determined to have not received prediction coding.

When the palette information has received prediction coding (YES in step 1702), the generation circuit 611 identifies a decoded adjoining block specified by the prediction direction flag included in the coded palette information 1541. Then, the generation circuit 611 determines whether or not that adjoining block has received palette coding in the coded video (step 1703). When the prediction direction flag is "1", the left adjoining block becomes the determination target while when the prediction direction flag is "0", the upper adjoining block becomes the determination target.

When the adjoining block has received palette coding (YES in step 1703), the prediction circuit 613 obtains the palette information of the adjoining block stored in the storage circuit 612 (step 1704). Then, the prediction circuit 613 stores the palette information of the adjoining block in the storage circuit 612 as the palette information of the process block, and outputs the palette information to the palette decoding circuit 1502.

When the adjoining block has not received palette coding (NO in step 1703), the generation circuit 611 generates palette information of the adjoining block from the pixel value 1542 of the decoded image of the adjoining block, and stores the palette information in the storage circuit 612 (step 1705). Then, the prediction circuit 613 stores the palette information of the adjoining block in the storage circuit 612 as the palette information of the process block, and outputs the palette information to the palette decoding circuit 1502.

In the above process, the generation circuit 611 performs the palette information generation process illustrated in FIG. 14 on the decoded image of an adjoining block as a process target image, and thereby generates palette information of the adjoining block. It is desirable that the algorithm used in step 1407 illustrated in FIG. 14 be identical to that used by the image coding device for generating palette information.

When the palette information of the process block has not received prediction coding (NO in step 1702), the prediction circuit 613 decodes the palette information included in the coded palette information 1541 so as to generate palette information of the process block (step 1706), the palette information having been coded explicitly. Then, the prediction circuit 613 stores the palette information of the process block in the storage circuit 612 and outputs the palette information to the palette decoding circuit 1502.

The configurations of the image coding device 401 illustrated in FIG. 4, the image decoding device 601 illustrated in FIG. 6, the image coding device 800 illustrated in FIG. 8 and the image decoding device 1500 illustrated in FIG. 15 are just exemplary, and some of the constituents of the image coding device and the image decoding device may be omitted or changed in accordance with the conditions or applications.

For example, when a coding mode other than the orthogonal transform coding mode or the DPCM coding mode is used as a coding mode other than the palette coding mode, the configurations of the prediction coding circuit 803 and the prediction decoding circuit 806 illustrated in FIG. 8 may be changed. As a coding mode other than the orthogonal transform coding mode or the DPCM coding mode, the intra block copy etc. for example may be used.

In such a case, the configurations of the switch 807, the loop filter 808, the prediction mode determination circuit 809, the intra-picture prediction generation circuit 810, the inter-picture prediction generation circuit 811, the image memory 812, the motion estimation circuit 813 and the switch 814 illustrated in FIG. 8 may further be changed. Also, the configurations of the prediction decoding circuit 1504, the switch 1505, the loop filter 1506, the intra-picture prediction generation circuit 1507, the inter-picture prediction generation circuit 1508, the image memory 1509 and the switch 1510 illustrated in FIG. 15 may be changed.

The flowcharts illustrated in FIG. 5, FIG. 7, FIG. 13A, FIG. 13B, FIG. 14 and FIG. 17 are just exemplary, and some of the processes may be omitted or changed in accordance with the configurations or conditions of the image coding device and the image decoding device. When for example prediction coding is performed on the palette information of a process block by using the palette information of the upper adjoining block alone in the palette information coding process illustrated in FIG. 13A and FIG. 13B, the processes in steps 1309 through 1314 can be omitted. Also, when prediction coding is performed on the palette information of the process block by using the palette information of the left adjoining block alone, the processes in steps 1303 through 1308 can be omitted.

When the adjoining block used for predicting the palette information of the process block is either the upper adjoining block or the left adjoining block, the prediction direction flag included in the coded palette information can be omitted. Further, it is also possible to use palette information of a block other than the upper adjoining block and the left adjoining block in the coding target picture in order to predict the palette information of the process block.

It is also possible for the coding circuit 413 to code the difference of palette information between an adjoining block and the process block so as to include the coded difference in the coded palette information in step 1308 illustrated in FIG. 13A and step 1314 illustrated in FIG. 13B. In such a case, in step 1704 and step 1705 illustrated in FIG. 17, the prediction circuit 613 decodes the coded difference so as to restore the difference, and uses the restored difference and the palette information of the adjoining block so as to generate palette information of the process block.

Coding target images to which palette coding mode is applied are not limited to a screen content image and may be other images that have a poor variation of pixel values. Also, coding target images to which palette coding mode is applied is not limited to a video, and may be a still image.

The image coding device 401 illustrated in FIG. 4, the image decoding device 601 illustrated in FIG. 6, the image coding device 800 illustrated in FIG. 8 and the image decoding device 1500 illustrated in FIG. 15 may be implemented as a hardware circuit or may be implemented by using an information processing apparatus (computer) as illustrated in FIG. 18.

The information processing apparatus illustrated in FIG. 18 includes a central processing unit (CPU) 1801, a memory 1802, an input device 1803, an output device 1804, an auxiliary storage device 1805, a medium driving device 1806 and a network connection device 1807. These constituents are connected to each other via a bus 1808.

The memory 1802 is a semiconductor memory such as for example a read only memory (ROM), a random access memory (RAM), a flash memory, etc., and stores a program and data used for an image coding process or an image decoding process. The memory 1802 can be used as the storage circuit 412 illustrated in FIG. 4 and FIG. 9, the storage circuit 612 illustrated in FIG. 6 and FIG. 16, the image memory 812 illustrated in FIG. 8 or the image memory 1509 illustrated in FIG. 15.

The CPU 1801 (processor) executes a program by for example using the memory 1802 so as to operate as the generation circuit 411 and the coding circuit 413 illustrated in FIG. 4 and FIG. 9 or as the generation circuit 611 and the prediction circuit 613 illustrated in FIG. 6 and FIG. 16.

The CPU 1801 also operates as the palette generation circuit 801, the palette coding circuit 802, the prediction coding circuit 803, the switch 804, the entropy coding circuit 805 and the prediction decoding circuit 806 illustrated in FIG. 8. The CPU 1801 also operates as the switch 807, the loop filter 808, the prediction mode determination circuit 809, the intra-picture prediction generation circuit 810, the inter-picture prediction generation circuit 811, the motion estimation circuit 813, the switch 814 and the control circuit 815.

The CPU 1801 also operates as the entropy decoding circuit 1501, the palette decoding circuit 1502, the palette generation circuit 1503 and the prediction decoding circuit 1504 illustrated in FIG. 15. The CPU 1801 also operates as the switch 1505, the loop filter 1506, the intra-picture prediction generation circuit 1507, the inter-picture prediction generation circuit 1508 and the switch 1510.

The input device 1803 is for example a keyboard, a pointing device, etc., and is used for inputting instructions or information from the user or the operator. The output device 1804 is for example a display device, a printer, a speaker, etc., and is used for outputting inquiries or process results to the user or the operator.

The auxiliary storage device 1805 is for example a magnetic disk device, an optical disk device, a magneto-optical disk device, a tape device, etc. The auxiliary storage device 1805 may be a hard disk drive. The information processing apparatus can store a program and data in the auxiliary storage device 1805 beforehand so as to load them onto the memory 1802 and use them.

The medium driving device 1806 drives a portable recording medium 1809 so as to access information stored in it. The portable recording medium 1809 is a memory device, a flexible disk, an optical disk, a magneto-optical disk, etc. The portable recording medium 1809 may be a compact disk read only memory (CD-ROM), a digital versatile disk (DVD) or a universal serial bus (USB) memory. The user or the operator can store a program and data in the portable recording medium 1809 so as to load them onto the memory 1802 and use them.

As described above, examples of a computer-readable recording medium that stores a program and data used for the processes include a physical (non-transitory) recording medium such as the memory 1802, the auxiliary storage device 1805 and the portable recording medium 1809.

The network connection device 1807 is a communication interface that is connected to a communication network such as a local area network (LAN), the Internet, etc. so as to perform conversion of data used for communications. The network connection device 1807 can transmit a coded video to the image decoding device 1500 and can also receive a coded video from the image coding device 800. The information processing apparatus can receive a program and data from an external device via the network connection device 1807 so as to load them onto the memory 1802 and use them.

Note that it is not necessary for the information processing apparatus to include all the constituents illustrated in FIG. 18, and some of the constituents may be omitted in accordance with the applications or conditions. For example, when an interface with the user or the operator is not necessary, the input device 1803 and the output device 1804 may be omitted. Also, when the information processing apparatus does not access the portable recording medium 1809, the medium driving device 1806 may be omitted.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An image coding device comprising:
a generation circuit configured to generate first palette information from a local decoded image of a first block used for predicting second palette information of a second block in a coding target image when the first block has not received palette coding, wherein a coded image of the first block is generated by coding the first block by using a coding method other than the palette coding and the local decoded image of the first block is generated by locally decoding the coded image of the first block in the image coding device;
a storage circuit configured to store the first palette information; and
a coding circuit configured to perform prediction coding on the second palette information by using the first palette information so as to generate coded palette information.

2. The image coding device according to claim 1, wherein the generation circuit generates the first palette information by sorting a plurality of entries corresponding to a plurality of colors included in the local decoded image of the first block on the basis of a plurality of pixel values included in the plurality of entries.

3. The image coding device according to claim 1, further comprising
a palette coding circuit configured to perform palette coding on the second block by using the second palette information so as to generate a coded image of the second block, wherein
the generation circuit generates the first palette information by sorting a plurality of entries corresponding to a plurality of colors included in the local decoded image of the first block on the basis of an algorithm used, for generating third palette information from the local decoded image of the first block, by an image decoding device that performs palette decoding on the coded image of the second block.

4. The image coding device according to claim 1, further comprising:
a prediction coding circuit configured to perform intra prediction coding or inter prediction coding on the first block so as to generate the coded image of the first block; and
a prediction decoding circuit configured to perform intra prediction decoding or inter prediction decoding on the coded image of the first block so as to generate the decoded image of the first block, wherein
the generation circuit generates the first palette information when the first block receives the intra prediction coding or the inter prediction coding.

5. The image coding device according to claim 1, wherein the first block is a coded block that adjoins the second block.

6. An image coding method comprising:
generating, by an image coding device, first palette information from a local decoded image of a first block used for predicting second palette information of a second block in a coding target image when the first block has not received palette coding, wherein a coded image of the first block is generated by coding the first block by using a coding method other than the palette coding and the local decoded image of the first block is generated by locally decoding the coded image of the first block in the image coding device; and
performing, by the image coding device, prediction coding on the second palette information by using the first palette information so as to generate coded palette information.

7. A non-transitory computer-readable recording medium having stored therein a program causing a computer to execute a process comprising:
generating first palette information from a local decoded image of a first block used for predicting second palette information of a second block in a coding target image when the first block has not received palette coding, wherein a coded image of the first block is generated by coding the first block by using a coding method other than the palette coding and the local decoded image of the first block is generated by locally decoding the coded image of the first block in the computer; and
performing prediction coding on the second palette information by using the first palette information so as to generate coded palette information.

8. An image decoding device comprising:
a generation circuit configured to generate first palette information from a decoded image of a first block used for predicting second palette information of a second block in a decoding target image when the first block has not received palette coding, wherein a coded image of the first block is generated by coding the first block by using a coding method other than the palette coding and the decoded image of the first block is generated by decoding the coded image of the first block;
a storage circuit configured to store the first palette information; and
a prediction circuit configured to predict the second palette information by using the first palette information.

9. The image decoding device according to claim 8, wherein
the generation circuit generates the first palette information by sorting a plurality of entries corresponding to a plurality of colors included in the decoded image of the first block on the basis of a plurality of pixel values included in the plurality of entries.

10. The image decoding device according to claim 8, wherein
the generation circuit generates the first palette information by sorting a plurality of entries corresponding to a plurality of colors included in the decoded image of the first block on the basis of an algorithm used, for generating third palette information from the decoded image of the first block, by an image coding device that performs palette coding on the second block by using the second palette information.

11. The image decoding device according to claim 8, further comprising:
a palette decoding circuit configured to perform palette decoding on the second block by using the second palette information so as to generate a decoded image of the second block; and
a prediction decoding circuit configured to perform intra prediction decoding or inter prediction decoding on the first block so as to generate the decoded image of the first block when the first block has received the intra prediction coding or the inter prediction coding.

12. The image decoding device according to claim 8; wherein
the first block is a decoded block that adjoins the second block.

13. An image decoding method comprising:
generating, by an image decoding device, first palette information from a decoded image of a first block used for predicting second palette information of a second block in a decoding target image when the first block has not received palette coding, wherein a coded image of the first block is generated by coding the first block by using a coding method other than the palette coding and the decoded image of the first block is generated by decoding the coded image of the first block; and
predicting, by the image decoding device; the second palette information by using the first palette information.

14. A non-transitory computer-readable recording medium having stored therein a program causing a computer to execute a process comprising:
generating first palette information from a decoded image of a first block used for predicting second palette information of a second block in a decoding target image when the first block has not received palette coding, wherein a coded image of the first block is generated by coding the first block by using a coding method other than the palette coding and the decoded image of the first block is generated by decoding the coded image of the first block; and
predicting the second palette information by using the first palette information.

* * * * *